US012497833B2

(12) United States Patent
Mattsson

(10) Patent No.: US 12,497,833 B2
(45) Date of Patent: Dec. 16, 2025

(54) MEANS FOR COLLAPSIBLE STEP LADDER

(71) Applicant: Hultafors Group AB, Gothenburg (SE)

(72) Inventor: Rikard Mattsson, Aneby (SE)

(73) Assignee: Hultafors Group AB, Gothenburg (SE)

( * ) Notice: Subject to any disclaimer, the term of this patent is extended or adjusted under 35 U.S.C. 154(b) by 442 days.

(21) Appl. No.: 18/247,854

(22) PCT Filed: Dec. 15, 2022

(86) PCT No.: PCT/SE2022/051182
§ 371 (c)(1),
(2) Date: Apr. 4, 2023

(87) PCT Pub. No.: WO2023/113684
PCT Pub. Date: Jun. 22, 2023

(65) Prior Publication Data

US 2024/0368941 A1 Nov. 7, 2024

(30) Foreign Application Priority Data

Dec. 16, 2021 (SE) .................................. 2151545-7

(51) Int. Cl.
*E06C 1/00* (2006.01)
*E06C 1/22* (2006.01)
(Continued)

(52) U.S. Cl.
CPC .................. *E06C 1/22* (2013.01); *E06C 7/06* (2013.01); *E06C 1/125* (2013.01)

(58) Field of Classification Search
CPC ... E06C 1/22; E06C 7/06; E06C 1/125; E06C 7/00; E06C 7/083
See application file for complete search history.

(56) References Cited

U.S. PATENT DOCUMENTS 5,738,186 A * 4/1998 Jones ...................... E06C 1/125 182/195
6,708,800 B2 * 3/2004 Kieffer .................... E06C 1/125 182/195

(Continued)

FOREIGN PATENT DOCUMENTS

CN 207813474 U 9/2018
EP 0527766 B1 6/1996

(Continued)

*Primary Examiner* — Amy J. Sterling
(74) *Attorney, Agent, or Firm* — Capitol City TechLaw

(57) ABSTRACT

A collapsible step ladder (1) comprising a first and a second ladder leg (2, 3) where the legs (2, 3) are hingedly connected to each other in one end. Each of the ladder legs (2, 3) comprising comprises at least one ladder section (4*a-c*), and where said at least one section (4*a-c*) comprises two tube portions (6, 7) arranged parallel to each other and interconnected at one end by a rung (8) to form a U-shaped ladder section, wherein said at least one ladder section (4*a-c*) is telescopically inserted into a lower ladder section (4*d*), wherein the lower ladder section (4*d*) comprises two ladder bars (17*a-b*, 18*a-b*) arranged parallel to each other and interconnected by at least one rung (9*a-b*, 11*a-b*), The collapsible step ladder (1) further comprises a connection bracket (40; 60; 80), wherein said connection bracket (40; 60; 80) has a main body having at least a first end portion (41; 61; 81) and a second end portion (43; 63; 83), wherein said first end portion (41; 61; 81) is attached to the lower ladder section (4*d*) of the first ladder leg (2) and wherein said second end portion (43; 63;83) is releasably connectable to the lower ladder section (4*d*) of the second ladder leg (3) when the collapsible step ladder (1) is in its collapsed state.

12 Claims, 15 Drawing Sheets

(51) Int. Cl.
*E06C 7/06* (2006.01)
*E06C 1/12* (2006.01)

(56) References Cited

U.S. PATENT DOCUMENTS

| | | | | |
|---|---|---|---|---|
| 9,416,591 | B2 * | 8/2016 | Kieffer | E06C 1/32 |
| 11,174,678 | B2 * | 11/2021 | Kieffer | E06C 7/08 |
| 2017/0130529 | A1 | 5/2017 | Tamez Reyes | |
| 2018/0163467 | A1 | 6/2018 | Parker et al. | |

FOREIGN PATENT DOCUMENTS

| | | | |
|---|---|---|---|
| EP | 1402143 | B1 | 3/2005 |
| EP | 1686233 | A1 | 8/2006 |
| EP | 3165706 | A1 | 5/2017 |
| GB | 2233022 | A | 1/1991 |

* cited by examiner

MEANS FOR COLLAPSIBLE STEP LADDER

This application claims priority under 35 USC 119 (a)-(d) from SE patent application No. 2151545-7 filed on Dec. 16, 2021, the entire contents of which are incorporated herein by reference.

TECHNICAL FIELD

The present invention relates to means for facilitating the carrying of a collapsible step ladder provided with ladder sections being telescopically inserted in each other.

BACKGROUND

As well-known to the person skilled in the art of combination ladders, a combination ladder may comprise a collapsible ladder and a step ladder.

A collapsible ladder, also called a telescopic ladder, are ladders usually comprise a number of tube portions having various diameters and which hence are telescopically insertable into one another. Every upper end of any of the tube portions are fastened to one end of a ladder step, whereas the other end of the ladder step is fastened to an upper end of a tube portion having the same diameter, the two tube portions and the ladder step forming a ladder section, the tube sections of which being insertable into an adjacent ladder section comprising tube portions having a larger diameter.

The resulting ladder may hence be collapsed by inserting higher ladder sections into lower ladder sections, and the ladder can be extended by extracting higher ladder sections from the lower ladder sections. A pin extending through the holes in the outer walls of two adjacent tube portions locks the tube portions to prevent the extended ladder from collapsing. Ladders having collapsible and expandable ladder sections are used in order to make the ladder smaller for storage and transport purposes.

Step ladders are self-supporting ladders. A combination ladder comprising a step ladder and a collapsible ladder is typically a ladder comprising two collapsible ladders according to the description above that are hinged together at an upper end of the ladders.

When the combination ladder is not in use, the combination ladder may be folded by arranging the two ladder parts parallel to each other. When the combination ladder is in use, the combination ladder may be unfolded by pulling the two ladders away from each other, thus a v-shaped or a y-shaped ladder is formed depending on the length of the two collapsible ladders.

Collapsible combination ladders present a number of advantages by improving access to locations that might otherwise be difficult to access by being both extendable and stand-alone ladders.

However, the increased number of features provided by a combination ladder also brings added complexity. Additionally, the incorporated features often lead to an increased weight of a given ladder. A collapsible combination ladder may thus be difficult to carry for the user. On one hand it is desirable to provide a ladder that can easily be unfolded for use by pulling the upper ladder and thus extracting the higher ladder sections from the lower ladder sections. On the other hand, it is also desirable to provide a ladder that can easily be carried by the user when moving the ladder.

It is the object of the present invention to provide means for facilitating the carrying of a collapsible combination ladder.

SUMMARY

An object of the present invention is to solve or at least mitigate the problems related to prior art. This object is achieved by means of the technique set forth in the appended independent claims; preferred embodiments being defined in the related dependent claims.

In an aspect, a collapsible step ladder is provided. The collapsible step ladder comprises a first and a second ladder leg, where the legs are hingedly connected to each other in one end, and where each of the ladder legs comprises at least one ladder section, and where said at least one section comprises two tube portions arranged parallel to each other and interconnected at one end by a rung to form a U-shaped ladder section, wherein said at least one ladder section is telescopically inserted into a lower ladder section, wherein the lower ladder section comprises two ladder bars arranged parallel to each other and interconnected by at least one rung. The collapsible step ladder further comprises a connection bracket, wherein said connection bracket has a main body having at least a first end portion and a second end portion, wherein said first end portion is attached to the lower ladder section of the first ladder leg and wherein said second end portion is releasably connectable to the lower ladder section of the second ladder leg when the collapsible step ladder is in its collapsed state.

In one embodiment, he first end portion is attached to one rung of the lower ladder section of the first ladder leg In one embodiment, the first end portion of the connection bracket is attached to a lower surface of said rung. In yet one embodiment, the first end portion of the connection bracket is attached to an upper surface of the at least one rung of the lower ladder section of the first ladder leg.

In one embodiment, the first end portion of the connection bracket is connected to the rung of the first ladder leg by screwing, welding or by a bayonet mount.

In one embodiment, the lower ladder section of the first and the second ladder legs comprises at least an upper rung and an intermediate rung, and wherein the second end portion of the connection bracket is releasably connectable to any one of the rungs or to any one of the two ladder bars of lower ladder section of the second ladder leg.

In one embodiment, the connection bracket further comprises an intermediate portion, and wherein the intermediate portion is arranged between first end portion and the second end portion.

In one embodiment, the at least one rung of the second ladder leg comprises a flange that extends from said rung. The second end portion may be configured to be releasably connectable to said flange of a rung of the second ladder leg.

The connection bracket may be made in an integrated piece from one material. The connection bracket may be made of aluminum.

In one embodiment, the collapsible ladder comprises several ladder sections, and wherein each ladder section is telescopically inserted into a lower ladder section.

In one embodiment, when the lower ladder sections of the first ladder leg and the second ladder leg are connected to each other by the connection bracket in a collapsed state, wherein the collapsible step ladder is configured to be lifted by lifting any part of the lower ladder section of the first ladder leg or the lower ladder section of the second ladder leg.

In one embodiment the first end portion of the connection bracket comprises a longitudinal recess. The recess may be configured to receive the at least one rung of the lower ladder section of the first ladder leg. In one embodiment the first end portion comprises two longitudinal recesses configured to receive the at least one rung of the first ladder leg arranged there between.

In one embodiment, the least one rung of the second ladder leg comprises a flange that extends from said rung in a direction towards the corresponding rung of the first ladder leg at an angle with respect to a horizontal plane, wherein the flange is an extension of the rung to which it is attached.

In a second aspect a connection bracket is provided. The connection bracket is suitable to be used with a collapsible step ladder comprising a first and a second ladder leg. The connection bracket has a main body having at least a first end portion (and a second end portion, wherein said first end portion is configured to be attached to the lower ladder section of the first ladder leg and wherein said second end portion is releasably connectable to the lower ladder section of the second ladder leg when the collapsible step ladder is in its collapsed state.

BRIEF DESCRIPTION OF THE DRAWINGS

In the following, the invention will be explained with reference to the accompanying drawings, wherein:

FIG. 5*a* shows a transversal cross-section view of a collapsible step ladder, where FIG. 5*a* is shown in an extended state and FIG. 5*b* is shown in a maximally collapsed state;

FIG. 6*a* is a prior art solution of how a collapsible step ladder may be carried and FIG. 6*b* shows a novel way of carrying a collapsible step ladder having a connection bracket according to the invention;

DETAILED DESCRIPTION OF EMBODIMENTS

Figure 1A:
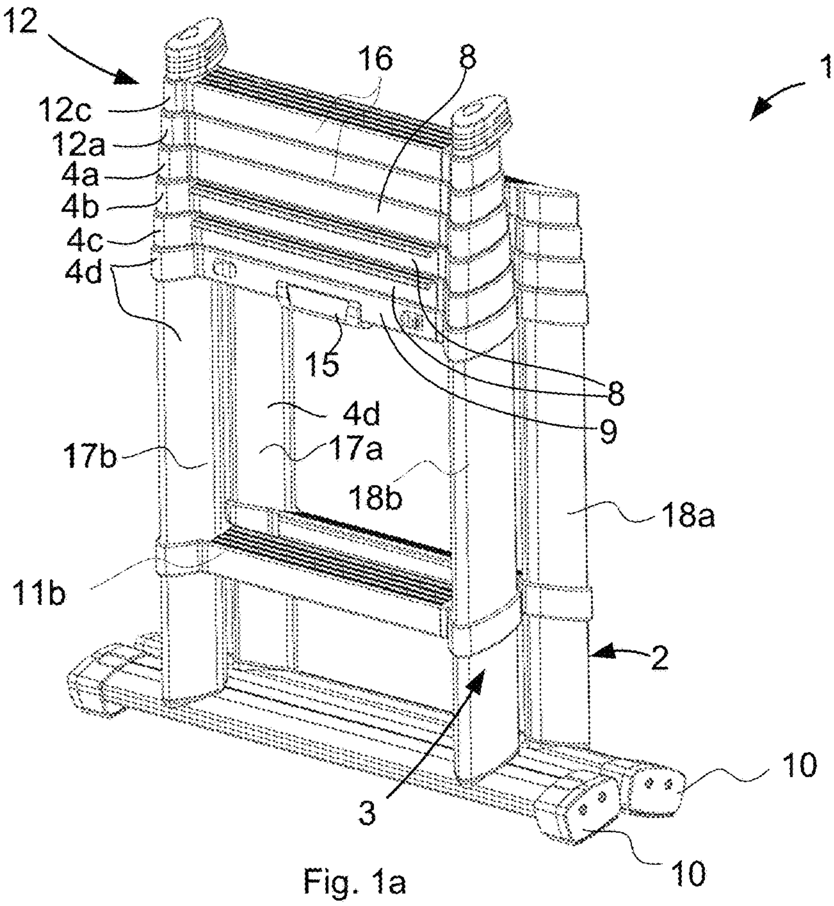
FIG. 1*a* shows a perspective view of a maximally collapsed step ladder.
Figure 1B:
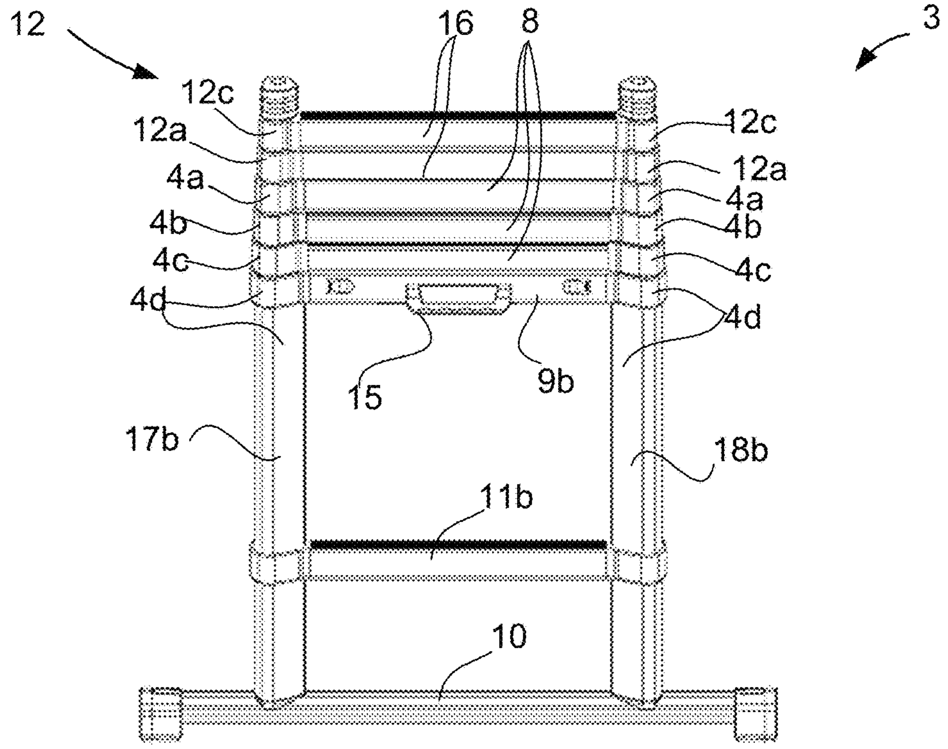
FIG. 1*b* shows a side view of the maximally collapsed step ladder.

FIG. 1*a* and FIG. 1*b* show different views of a collapsible step ladder 1 in a maximally collapsed state. In FIG. 1*a-b* a combination ladder comprising a collapsible ladder and a step ladder is shown. The ladder will further on be called a collapsible step ladder 1.

The step ladder 1 comprises a first ladder leg 2, which is hingedly connected to a second ladder leg 3 in the upper ends of the first and second ladder leg 2, 3. This connection is preferably made by a hinge connection 5.

Each of the ladder legs 2, 3 comprise several ladder sections 4*a-c*, where each ladder section 4*a-c* comprises two ladder bars 6, 7, arranged parallel to each other and interconnected at one end by a rung 8 to form a U-shaped ladder section 4*a-c*. The ladder sections 4*a-c* are telescopically inserted into a lower ladder section 4*d* to form a collapsible ladder leg 2, 3. The lower ladder section 4*d* comprises two ladder bars 17, 18, arranged parallel to each other and interconnected at an upper end by an upper rung 9, at a lower end by a ladder base 10 and in between the upper rung 9 and the ladder base 10 by an intermediate rung 11. It is preferred if the lower ladder section 4*d* is fixed, i.e not collapsible. A fixed ladder section in the lowest section creates a frame work of the ladder, that creates stability for the above collapsible ladder sections. The fixed rung could be referred to as an intermediate rung.

In FIGS. 1*a* and 1*b*, one intermediate rung 11 is provided. However, more than one intermediate rung could be provided. Two or three intermediate rungs may for instance be provided.

The ladder legs 2, 3 comprises at least one ladder section 4*a-c*. In one embodiment the ladder legs 2,3 comprises at least two ladder sections 4*a-c*. However, the number of ladder sections could vary and be for example three, four or five ladder sections but arranged so that they can be telescopically inserted into the lower ladder section 4*d*.

Each rung 8, 9, 11 comprises a retaining mechanism for automatically locking the ladder sections relative to one another when the ladder legs 2,3 are extended. The retaining mechanism could be any kind previously known in the art, e.g. any of the retaining mechanisms shown in EP-B1-0 527 766 or EP-A1-1 402 143.

The first ladder leg 2 is preferably very similar to the second ladder leg 3. The reference numerals are thus identical for both ladder legs. For sake of clarity, the upper rung 9 and the intermediate rung 11 are denoted as 9*a*, 11*a* for the first ladder leg 2 and 9*b*, 11*b* for the second ladder leg 3. Moreover, the ladder bars 17, 18 of the first ladder leg 2 are denoted 17*a*, 18*a* and the ladder bars of the second ladder leg 3 are denoted 17*b*, 18*b*.

However, in addition to what has been described for the first ladder leg 2, the second ladder leg 3 may further be provided with a support part 12 in one end. The support part 12 is then telescopically extendible from the second ladder leg 3 to form a ladder extension 12 of the ladder leg 3, and the support part 12 projects above the hinge connection 5 between the two ladder legs 2, 3. The support part 12 comprise, at least one support section 12*a-c*, each support section comprising two ladder bars 6, 7 arranged parallel to each other and interconnected at one end by a rung 16 to form at least one U-shaped support section 12*a-c*. In FIG. 1*a*, the collapsible step ladder 1 is illustrated with two support sections 12*a*, 12*c*. The support part 12 enables the user of the step ladder to stand on the upper ladder section 4*a*-4*b* as the support part 12 makes the user feel safe. The support part 12 could also be used to lean the collapsible stepladder 1 against a wall.

Figure 2:
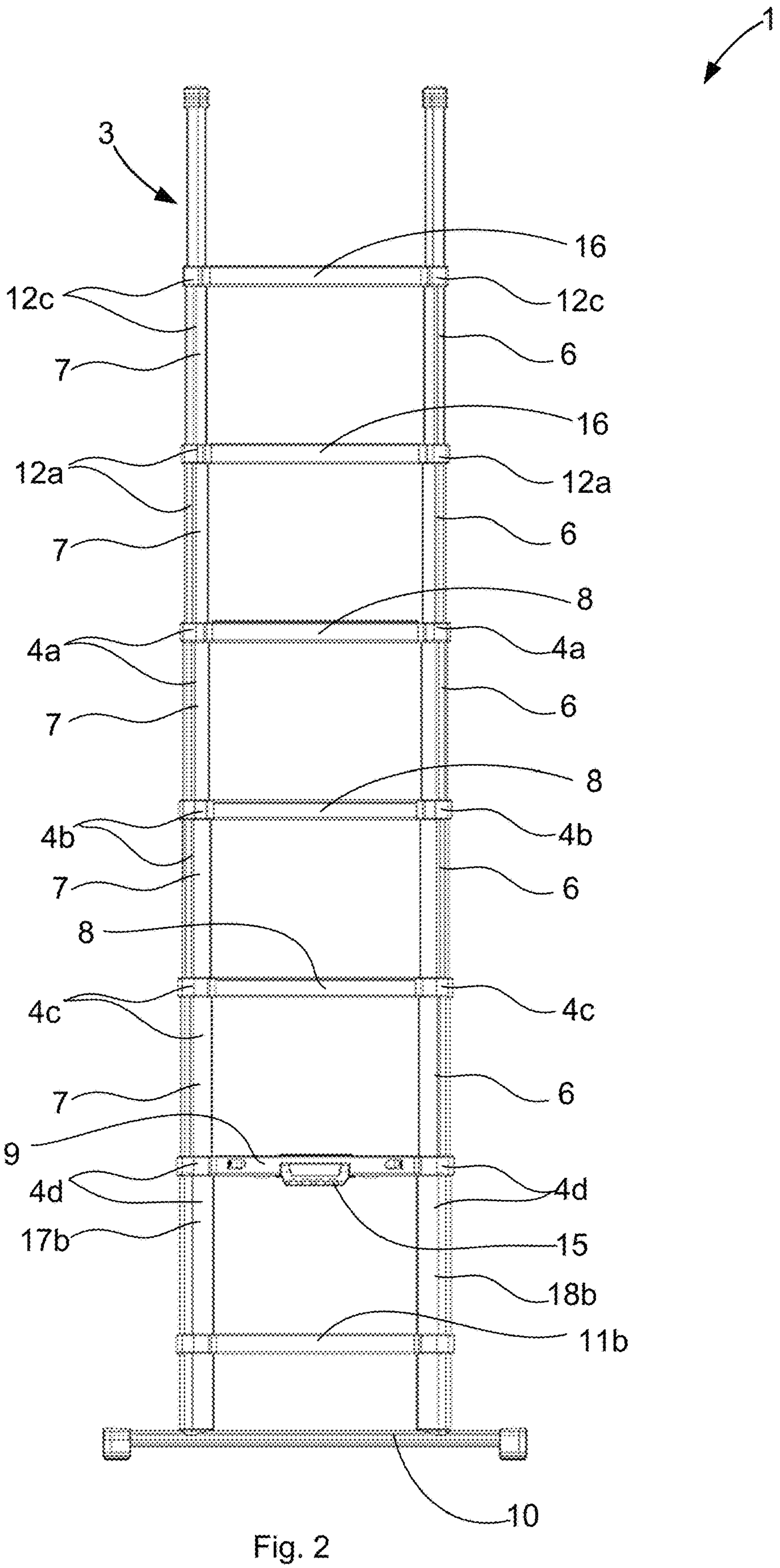
FIG. 2 shows a side view of the collapsible step ladder where all ladder sections are fully extended.
Figures 5A, 5B:
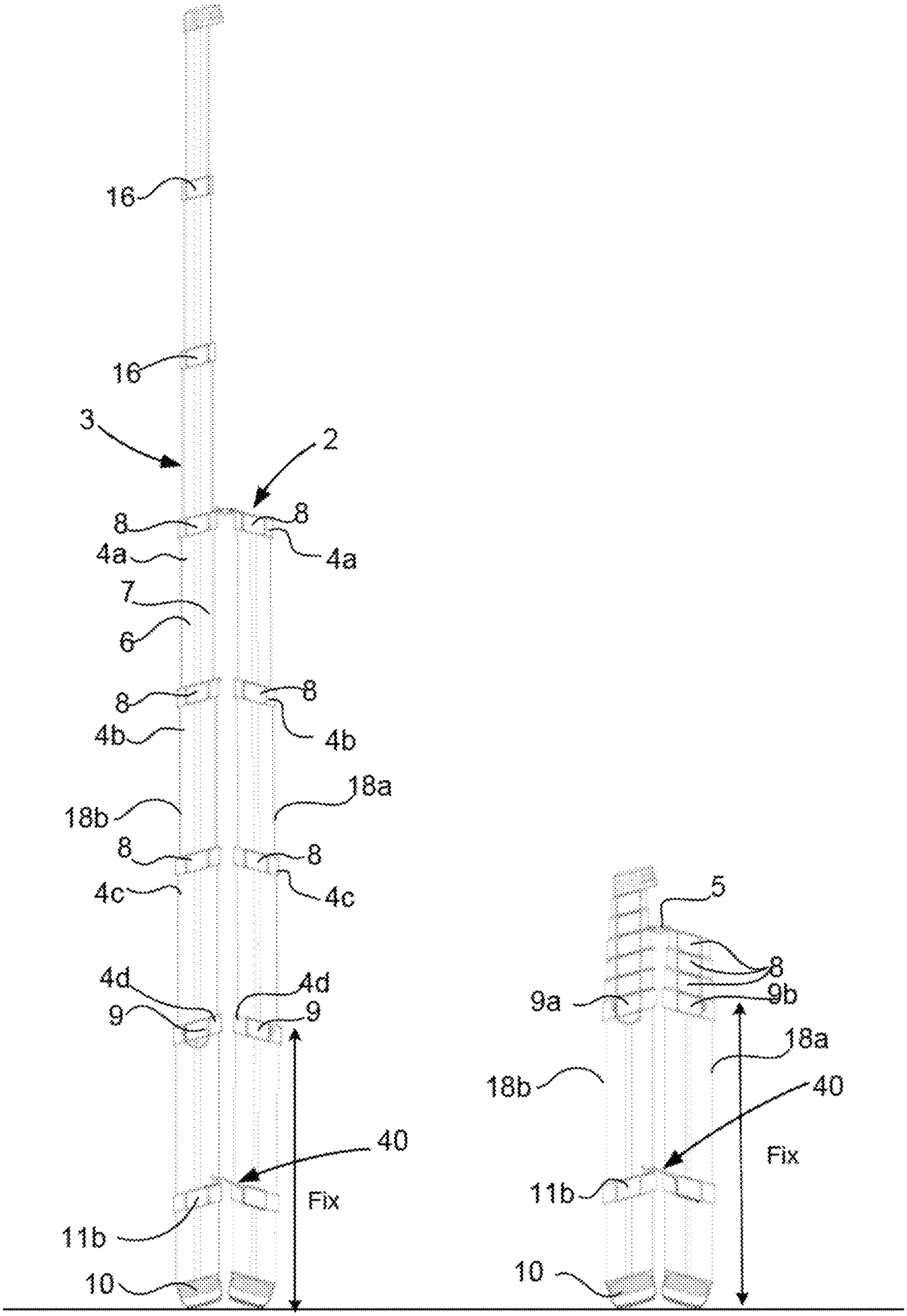

FIG. 2 shows a side view of the collapsible step ladder 1 where the ladder sections 4*a*-4*c* are fully extended. The U-shaped ladders sections 4*a-c* formed by the two ladder bars 6, 7 interconnected at one end by one rung 8 are clearly visible. The lower ladder bars 17, 18 of the lower ladder section 4*d* are unchanged in the fully extended illustration of the collapsible ladder step 1 as the lower ladder section 4*d* are adapted to receive the ladder sections 4*a-c* in the collapsed state. It is clarified that the lower ladder section 4*d* cannot be collapsed or extended. This is also illustrated by FIG. 5*a*-5*b* which will be described in detail further on. The lower ladder section 4*d* is comprising the upper rung 9 and the intermediate rung 11.

As shown in for example FIG. 1*a-b* and FIG. 2, the ladder 1 may be provided with at least one grip handle 15. The grip handle 15 or handles may be of any shape suitable to be carried, for example a rectangular handle, a rounded handle or a knob. The grip handle(s) 15 may be provided on a bottom side of a rung, i.e. on the opposite side of the step surface. In one embodiment the grip handle 15 is arranged on the bottom side of the rung as a separate unit. The grip handle and the rung are thus not constructed as a single unit. In another embodiment the grip handle 15 is arranged in integral with the rung, and thus constructed as a single unit. In yet another embodiment the grip handle 15 is provided on a bottom plate (not shown), where the bottom plate is removable arranged to the main section of the rung. The bottom plate may be constructed in the same material as the rung. The grip handle 15 is constructed such that it is easy to carry. In a preferred embodiment, the handle is not removable from the ladder 1.

Although not shown in the figures, it should be understood by the skilled person that the grip handle 15 may be arranged on only one or several rungs of a collapsible ladder. Additionally, the grip handle 15 may be arranged on either the first ladder leg 2 or the second ladder leg 3 or on both.

Figure 3A:
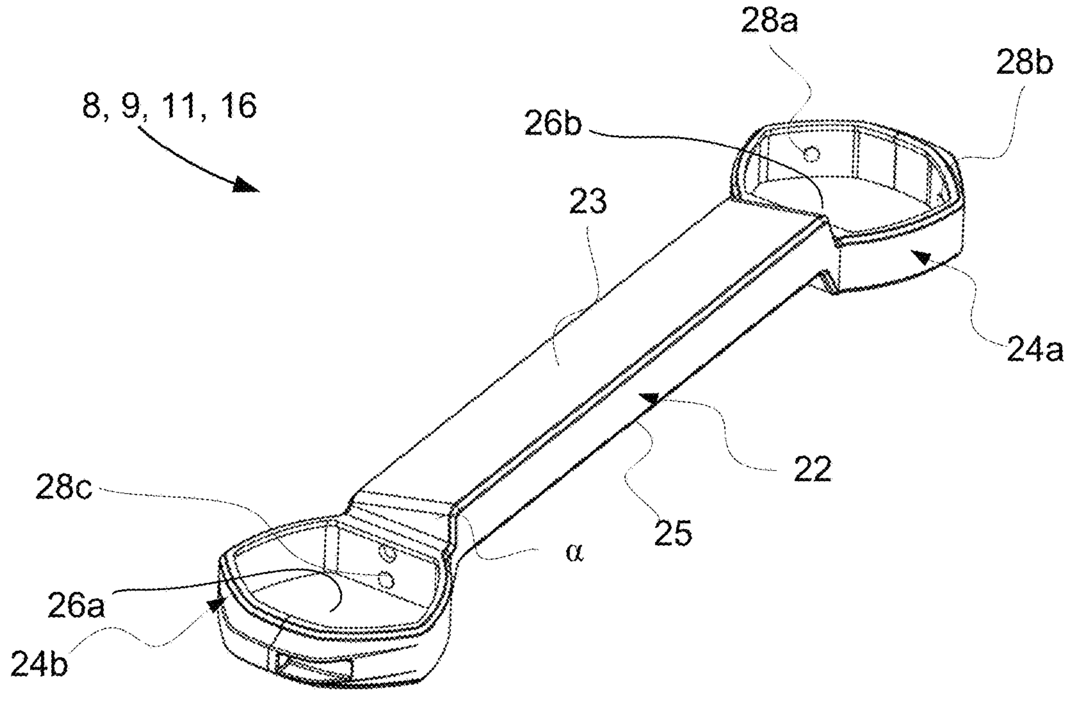
FIGS. 3*a-b* shows different views of a rung of the collapsible step ladder.
Figure 3B:
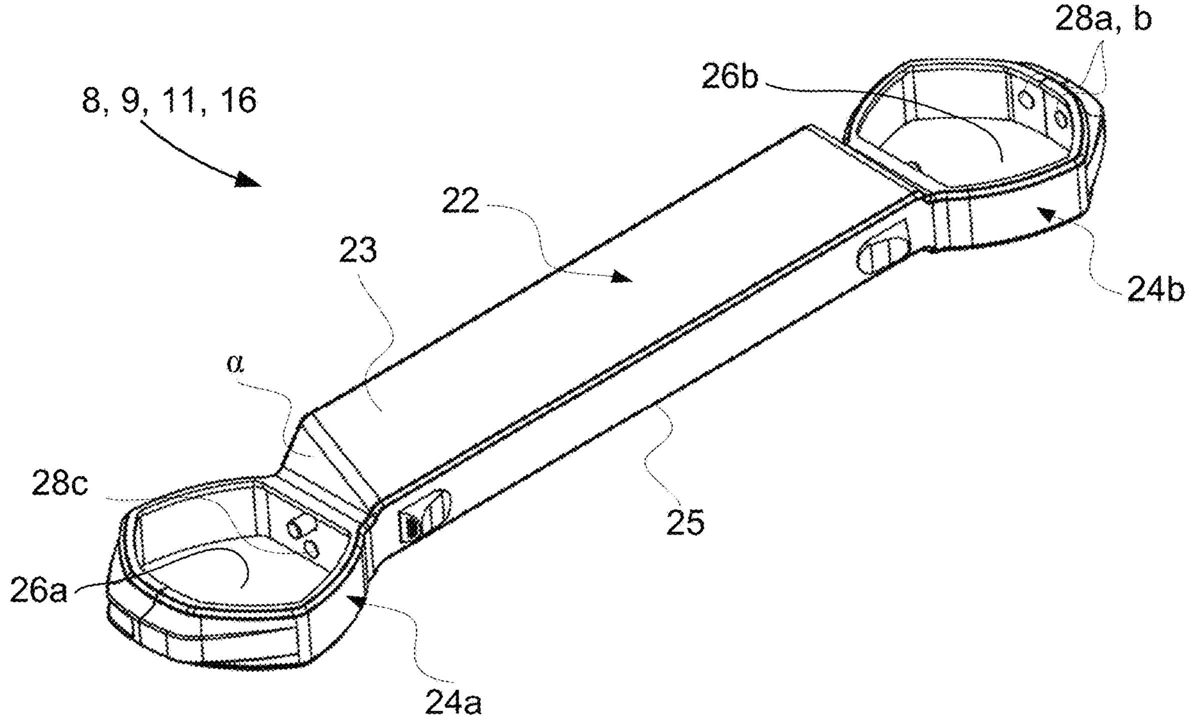

FIGS. 3*a* and 3*b*, illustrate an embodiment of a rung 8, 9, 11, 16 in different perspective views. Each rung 8, 9, 11, 16 comprises a main section 22, a first bracket section 24*a* and a second bracket section 24*b*. The first and second bracket sections 24*a*, 24*b* are arranged at each end of the rung 8, 9, 11, 16 to receive the respective ladder tube 6, 7 or ladder bar 17, 18. Each bracket section 24*a*, 24*b* is arranged with an opening 26*a*, 26*b* having the same shape as the cross-sectional shape of the corresponding ladder tube 6, 7 or ladder bar 17, 18. The two bracket sections 24*a*, 24*b* may be identical and symmetrical to one another, i.e. the first bracket section 24*a* could be arranged on either the first or second ladder tube 6, 7 or ladder bar 17, 18.

The rung 8, 9, 11, 16 may be provided as a single integrated unit, where the main section 22, the first bracket section 24*a* and the second bracket section 24*b* are one single piece made in one material. The rung 8, 9, 11, 16 may further comprise rung protrusions 28*a-c* arranged to fit three corresponding mounting holes of the ladder tube 6, 7, 17, 18. This secures the rung 10, 12 to the ladder tube 6, 7, 17, 18. The rung protrusions 28*a-c* are each arranged on the rung 8, 9, 11, 16 so that it corresponds to the mounting holes of the ladder tube 6, 7.

In order to facilitate the assembly step in the manufacturing process the rung 8, 9, 11, 16 may additionally or alternatively be arranged to ladder tube 6, 7 or ladder bar 17, 18 using clamping.

The main section 22 of the rung 8, 9, 11, 16 comprises a step surface 23, also called an upper surface of the rung 8, 9, 11, 16, which is the surface that the user is intended to place their feet on during use of the ladder 1. The main section 22 further comprises a lower surface 25, also called the bottom surface of the rung 8, 9, 11, 16. The step or upper surface is arranged opposite of the bottom or lower surface. The lower surface 25 may be flat or inclined.

The main section 22 of the rung 8, 9, 11, 16 may be slightly inclined to provide a more user-friendly ladder 1. In one embodiment, the main section 22 is inclined with an angle $\alpha$ with respect to a horizontal plane. The angle $\alpha$ may range between 10 and 20 degrees, and more preferably around 15 degrees.

Figure 4A:
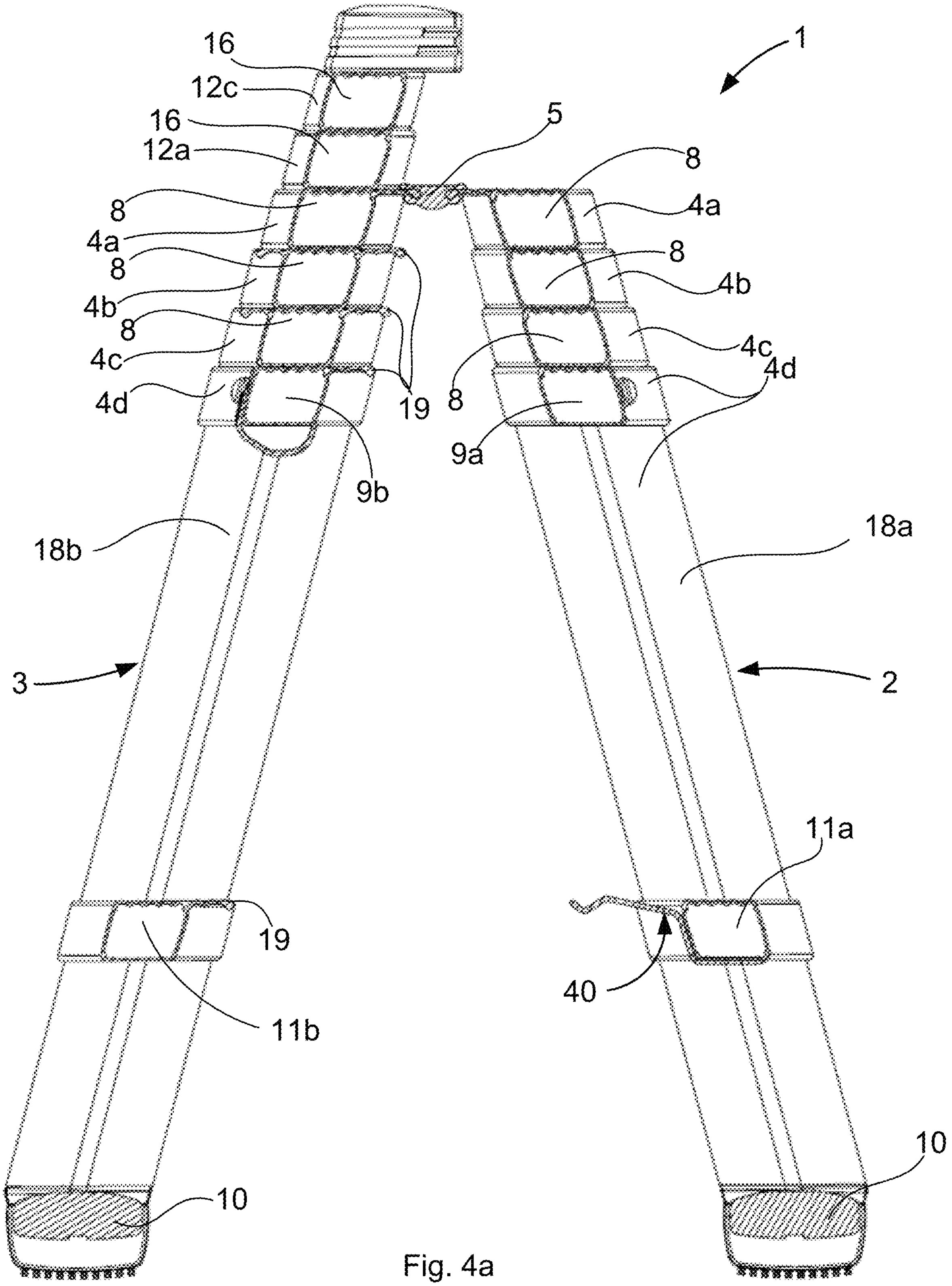
FIG. 4*a-c* show a transversal cross-sectional view of the collapsible step ladder with a connection bracket according to a first embodiment.
Figure 4B:
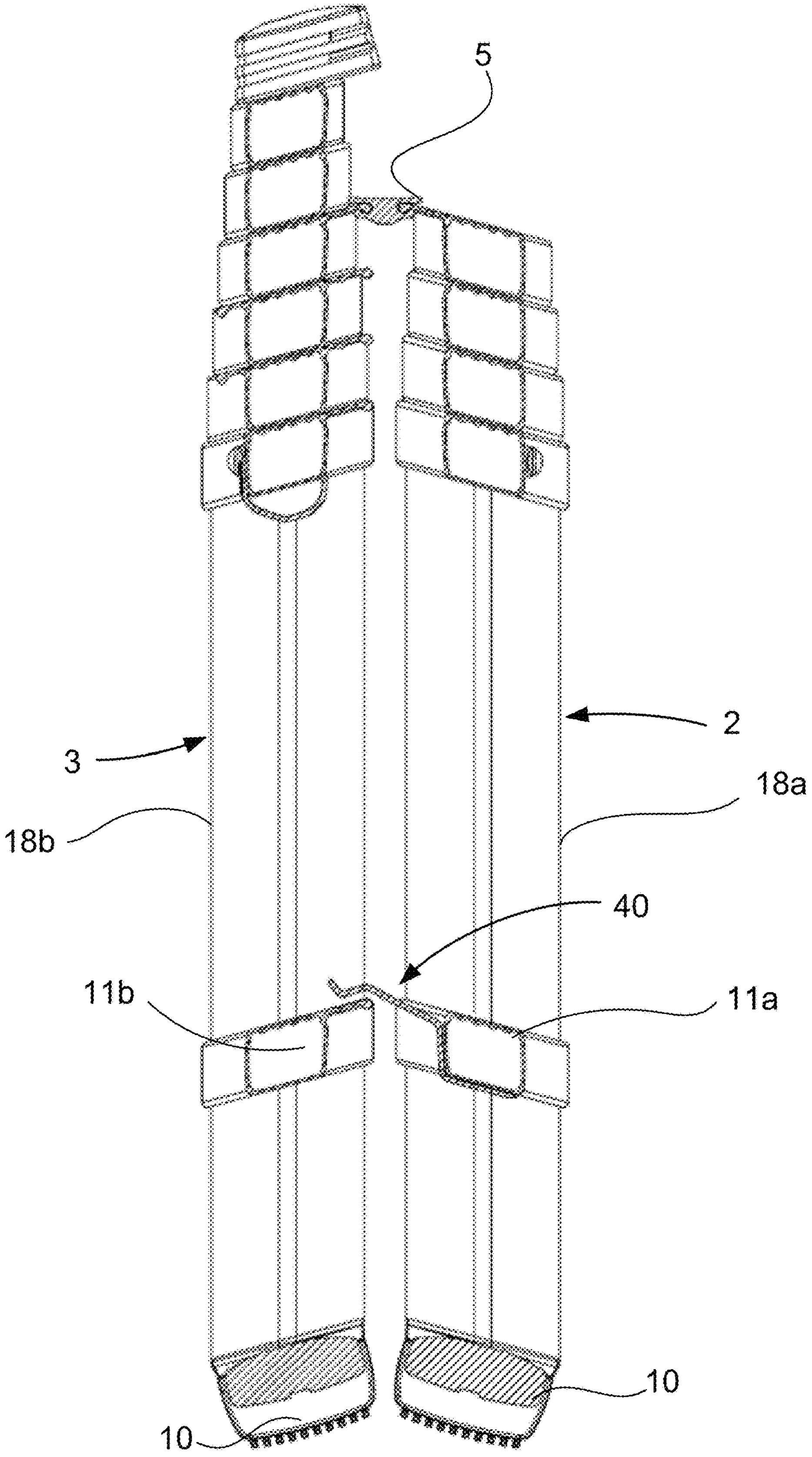
Figure 4C:
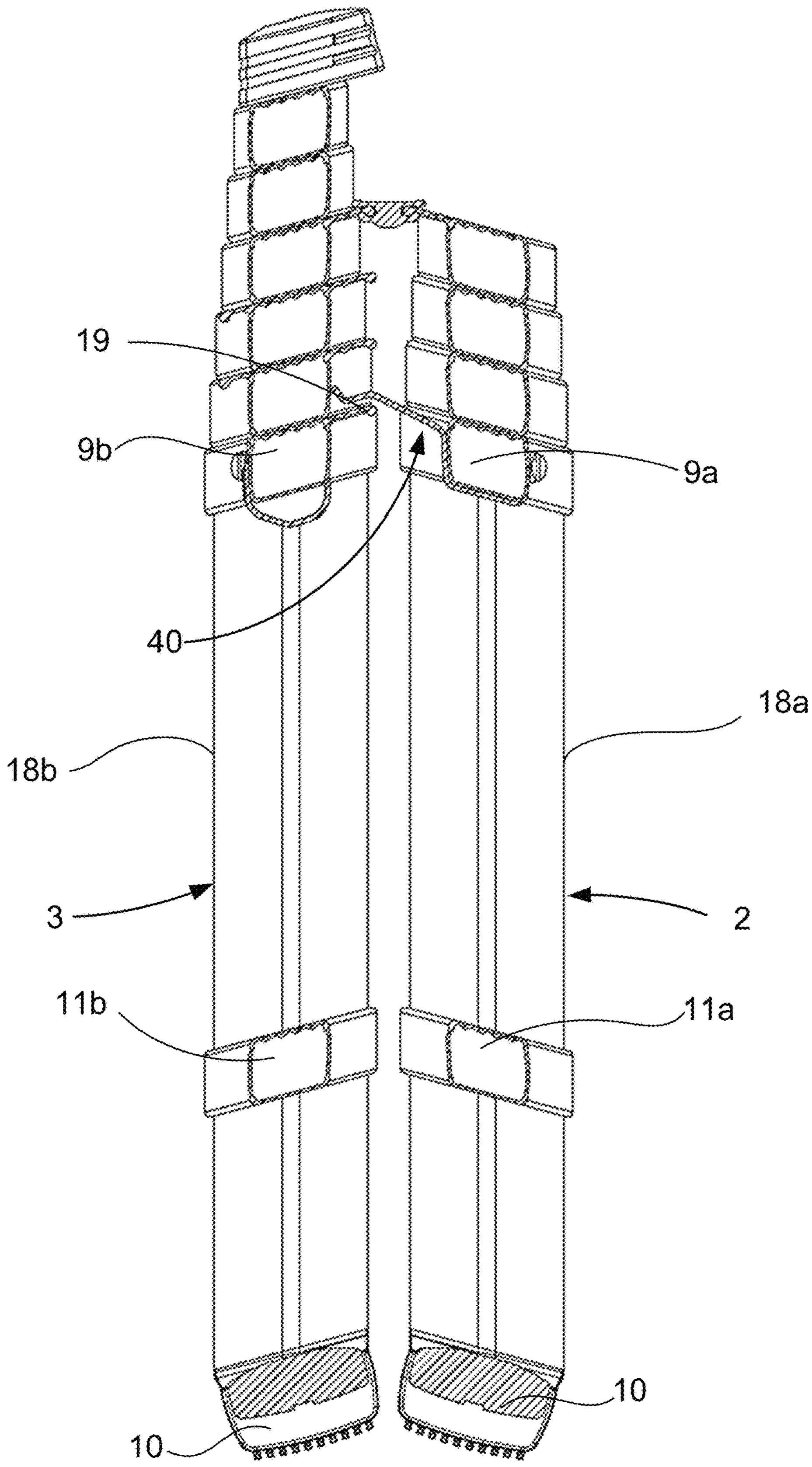

FIG. 4*a-c* show transversal cross-sectional views of the collapsible step ladder 1. The first and the second ladder legs 2, 3 are hingedly connected by a hinge 5. The hinge 5 is arranged such that the ladder legs 2, 3 are arranged on the same level, or height from the ground.

In FIG. 4*a*, the collapsible ladder 1 is shown in a partly collapsed state, where the first ladder leg 2 and the second ladder leg 3 are arranged with an angle to each other. In the maximally collapsed state which is shown in FIG. 4*b*-4*c*, the first ladder leg 2 and the second ladder leg 3 are arranged essentially parallel to each other.

Further, the several ladder sections 4*a-c* of the first and the second ladder legs 2, 3 are shown in FIG. 4*a-c*. The lower ladder section 4*d* is also shown with the upper rung 9 and the intermediate rung 11.

Preferably, the lower ladder section 4*d* of the first ladder leg 2 and the second ladder leg 3 have at least two rungs 9, 11. In one embodiment, this is the previously described upper rung 9 and an intermediate rung 11.

As illustrated in FIG. 4*a*-4*c*, one or more of the rungs 8, 9, 11, 16 of the second ladder leg 3 may comprise a flange 19 that extends from said rung 8, 9, 11, 16 towards the opposite rung 8, 9, 11, 16 of the first ladder leg 2 with respect to a horizontal plane. As the flange 19 is an elongation of rungs 8, 9, 11, 16, the flange 19 may be inclined with the same angle as the main section 22 of the rung 8, 9, 11, 16 with respect to the horizontal plane as is illustrated in FIG. 4*a*-4*c*. The flange 19 may also have another inclination than the main section 22 as illustrated in FIG. 11*a*-11*b* that will be described in detail later on.

Collapsible combination ladders known in the art are displaced by carrying the ladder in both of the lower ladder steps. Such a ladder step is provided on a fixed tube portion so that when the user lifts the step, the ladder will not extend. However, this is not an ergonomically satisfying solution as the user has to bend deeply in order lift the ladder and might hurt his/her back. Another alternative is to carry the ladder in the tube portion but this can difficult for a collapsible combination ladder where the weight of the ladder is not distributed evenly when in a folded position which is often the case.

The inventors of the present invention have thus realized that there is a need to provide means for facilitating the carrying of a collapsible combination ladder in its collapsed state, and that this could be achieved by the use of a connection bracket 40; 60; 80. Different embodiments of a connection bracket will now be described with reference to FIGS. 4*a*-13*b*.

Before turning into details of the connection brackets 40; 60; 80, the benefits of the novel connection bracket 40, 60, 80 will be described with relation to the situation when the collapsible step ladder 1 is to be carried or in other ways transported. This is schematically illustrated in FIG. 6*a*-*b*.

Figure 6A:
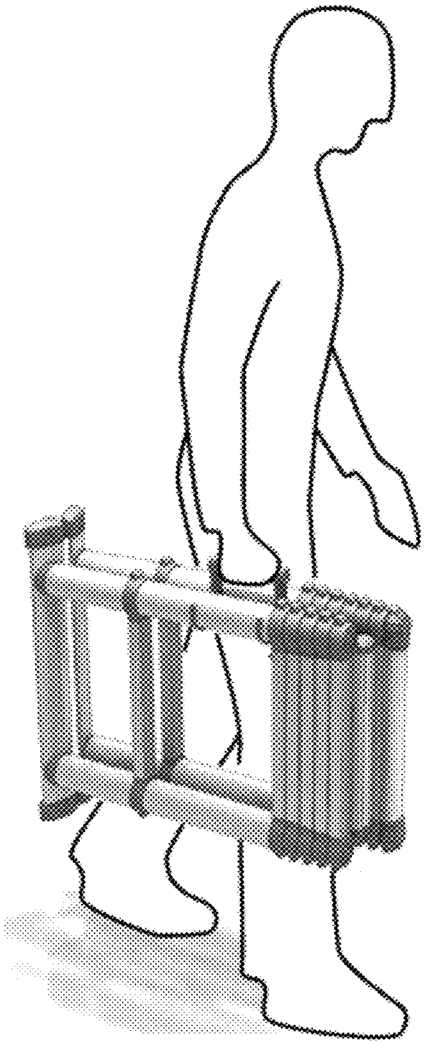
Fig. 6a Prior Art
FIGS. 6*a-b* show a schematic illustration of a user carrying a collapsible step ladder, where

FIG. 6*a* shows a collapsible step ladder 1 according to prior art and the prior art way of carrying such a ladder. In the prior art, a handle is releasably attached to one of the ladder bars of the collapsible ladder. In the prior art solution shown in FIG. 6*a*, the user has attached a removable handle to the tube portions 6,7 in order to facilitate the movement. However, this removable handle needs to be attached to the ladder 1 once it is lying down. This causes drawbacks for the user, as the position is not ergonomic as well as the weight of positioning the ladder 1 in a horizontal positon. In the prior art solution, the ladder has to be handled in a horizontal position, both for adding the handle and carrying the ladder but also in order to reduce the risk of the ladder tipping over. Additionally, when carrying the ladder 1 with a removable handle, 100% of the weight is carrying trough said handle. Hence, the hand and the arm of the user is carrying the whole weight. The handle is also a drawback as it is a separate piece that can be misplaced at the workplace. As the handle is an extra component, the manufacturing cost may also increase. Moreover, the handle has to be in the correct shape in order to fit the different tube sizes.

The collapsed state could also be referred to as a fully contracted configuration, a storage position of the ladder or a lifting configuration of the ladder.

Figure 6B:
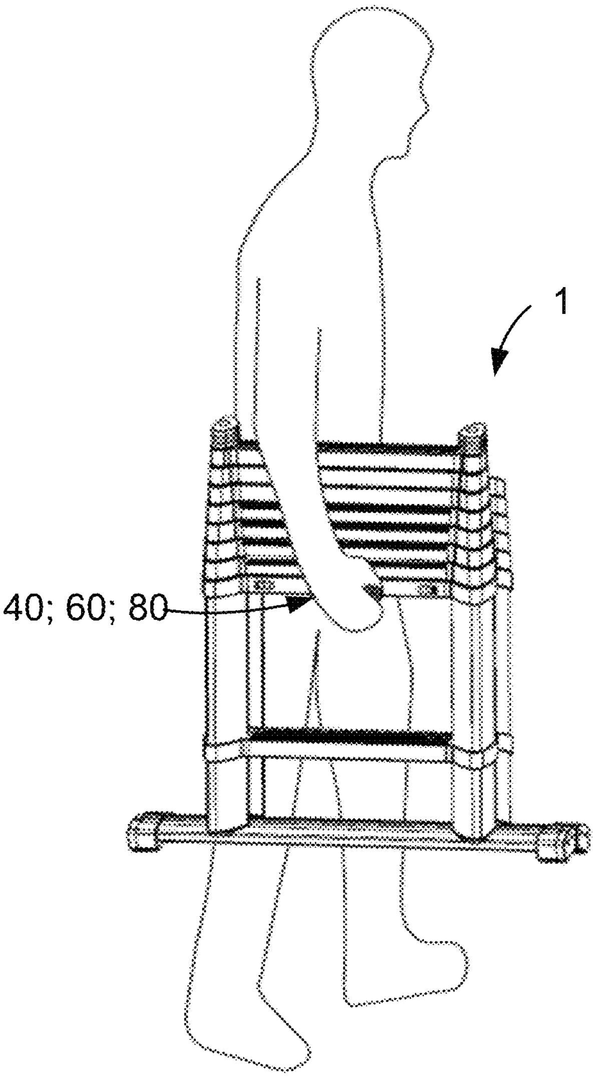

FIG. 6*b* shows the novel and inventive way of carrying a ladder, in its collapsed state, having a connection bracket 40; 60; 80. When the lower ladders sections 4*d* of the first ladder leg 2 and of the second ladder leg 3 are attached to each other by the connection bracket 40; 60; 80, the collapsible ladder 1 may be lifted in a collapsed state by lifting any part of the lower ladder section 4*d* of the first ladder leg 2 or the lower ladder section 4*d* of the second ladder leg 3. The user can thus carry the ladder in one rung 8, 9.

Without the bracket 40; 60; 80, it is not possible for the user the carry the collapsible step ladder 1 in the way illustrated in FIG. 6*b* as the ladder sections 4*a*-*c* of the ladder leg 2,3 that is not being held by the user, will telescope out of each other and out of the lower ladder section 4*d*. Thus, the collapsible step ladder 1 will no longer be in the collapsed state which makes it more difficult for a user to carry the collapsible step ladder 1. Hence, without the novel and inventive connection bracket 40; 60; 80 the user would have to hold and lift both lower ladder sections 4*d* of the first ladder leg 2 and the second ladder leg 3. The same applies to first ladder leg 2 when lifting the second ladder leg 3.

Thus, the connection bracket is enabling the user to lift and transport the collapsible step ladder 1 in an easy way. Moreover, the way of carrying the ladder 1, which is achieved by the connection bracket, allows for a better weight distribution. The user will no longer carry 100% of the weight of the ladder 1 using a single handle and thus carrying the ladder only by one hand and one arm. Instead, the ladder 1 can be leaned towards the body of the user, such as for example the hip of the user. As much as 5-15% of the weight may be distributed on other body parts rather than having all weight on a single hand. Thus, the user will have the feeling that the ladder 1 is lighter to carry than a prior art solution.

In the present invention a grip handle 15 could be used to facilitate the carrying of the step. However, a grip handle 15 is not essential to benefit from the above mentioned effects.

The present inventors also realized that as the ladder tubes are smooth and flat, no force will urge the ladder against the lifting direction.

Figure 11:
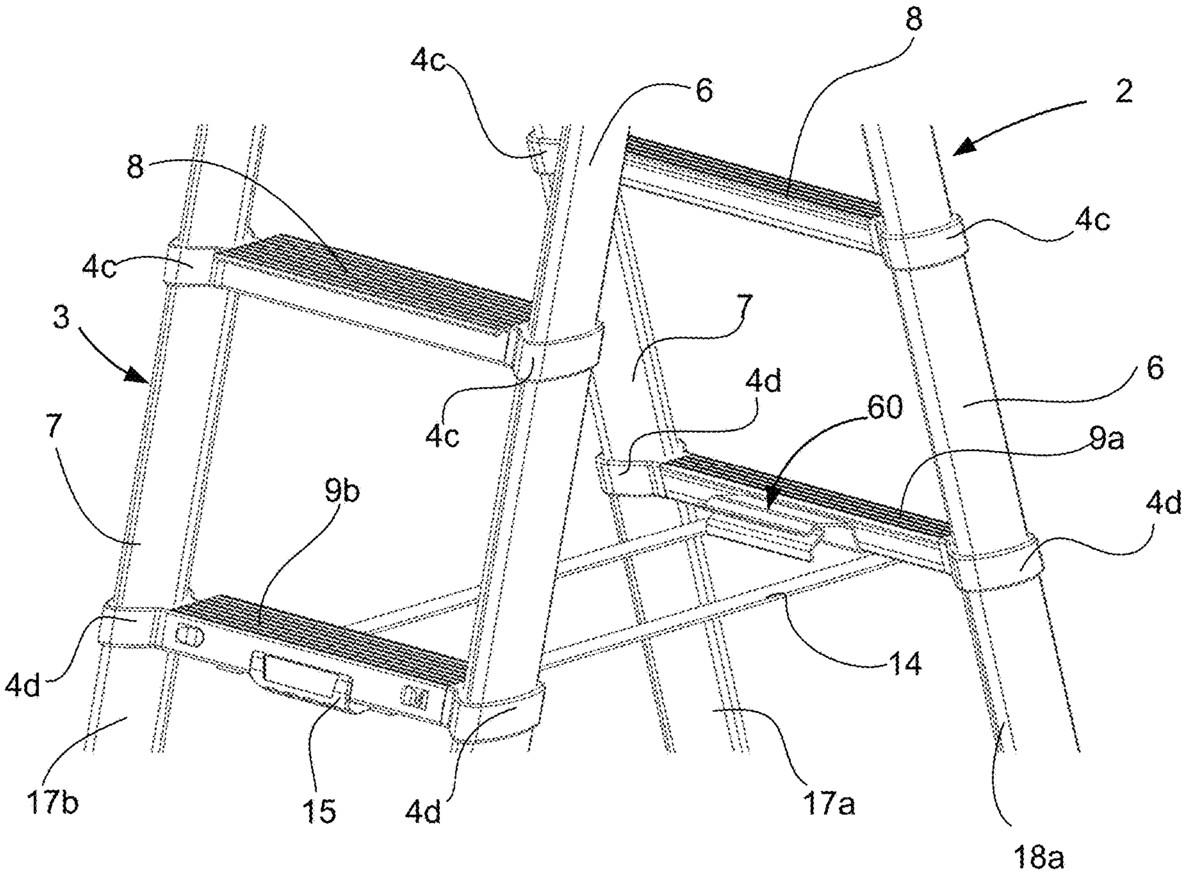
FIG. 11 shows a perspective view of a part of the fully extended collapsible step ladder with the connection bracket according to the second embodiment attached to the ladder.
Figure 12A:
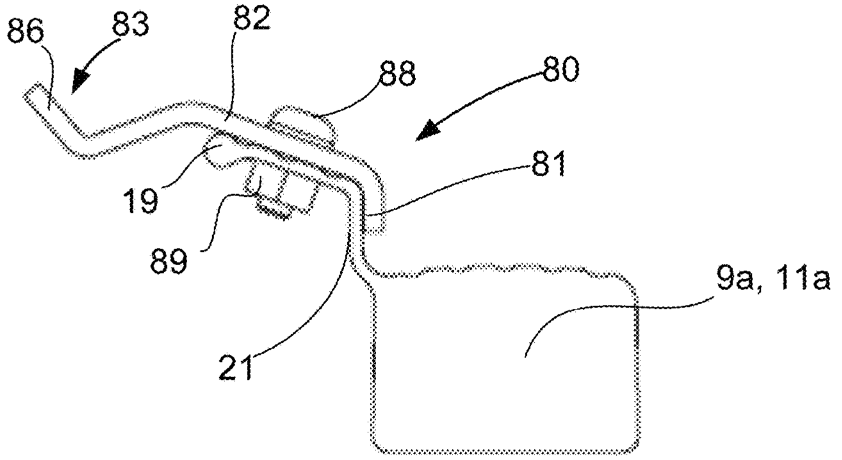
FIG. 12*a* shows a transversal cross-sectional view of a connection bracket according to a third embodiment attached to a rung with fastening means.
Figure 12B:
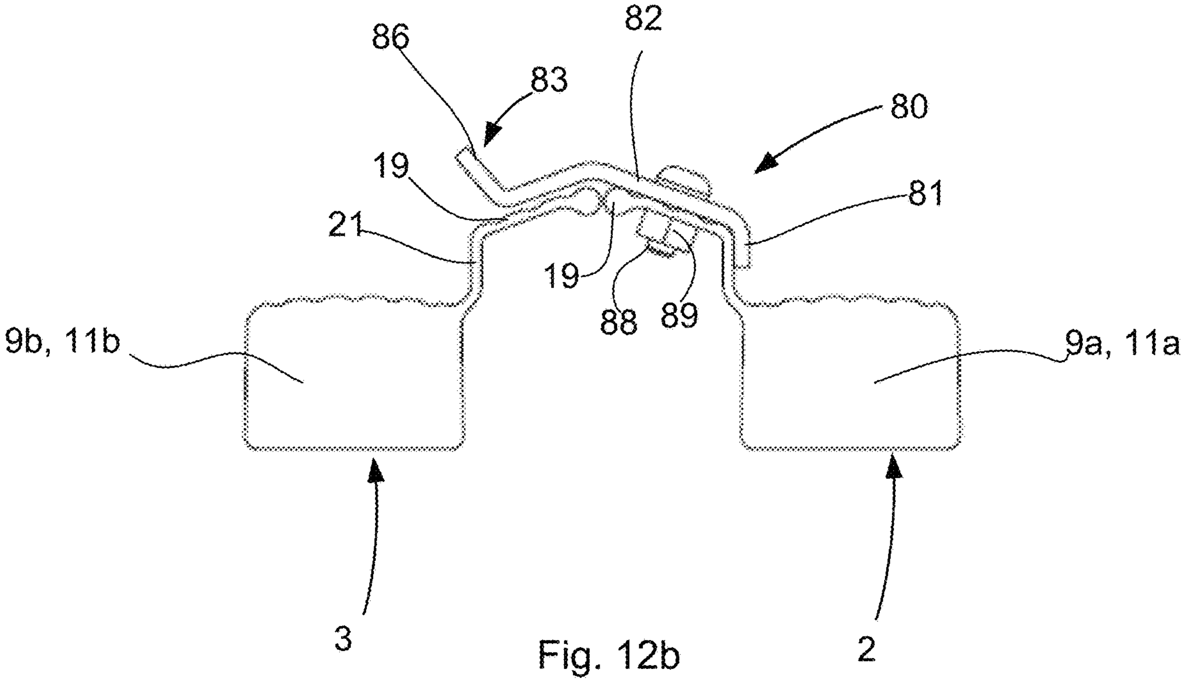
FIG. 12*b* shows a transversal cross-section view of the connection bracket of the third embodiment attached to a rung with fastening means and abutting another rung.
Figure 13A:
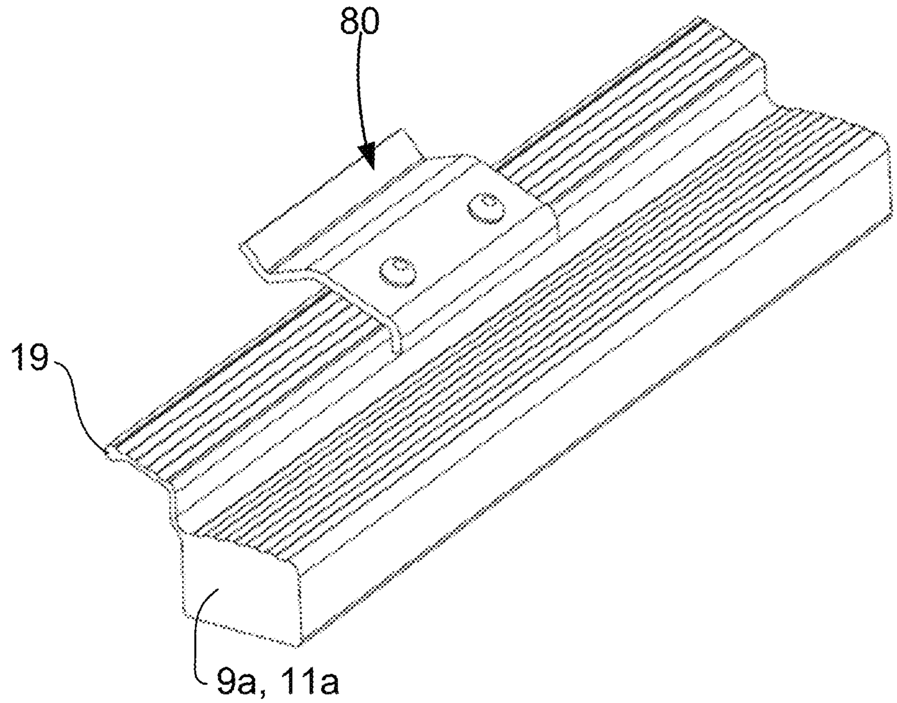
FIG. 13*a* shows a perspective view of the connection bracket of the first embodiment attached to a rung with fastening means.
Figure 13B:
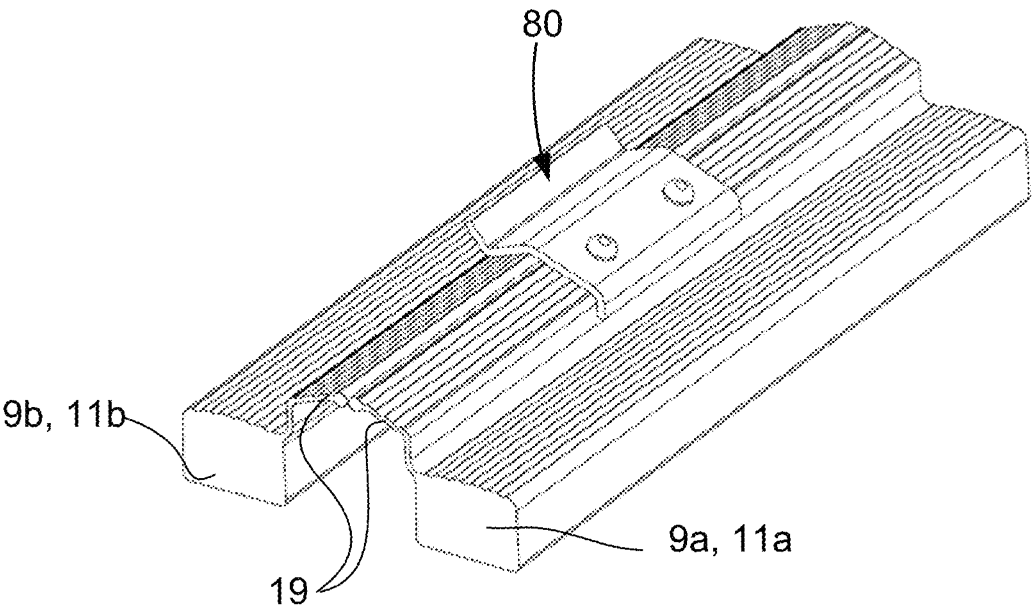
FIG. 13*b* shows a perspective view of the connection bracket of the first embodiment attached a rung with fastening means and abutting another rung.

The connection bracket 40; 60; 80 will now be described more in detail, with reference to FIGS. 4-5 and 7-13. A connection bracket 40 of a first embodiment is shown in FIGS. 4-5 and FIGS. 7-8, a connection bracket 60 of a second embodiment is shown in FIGS. 9-11, and a connection bracket 80 of a third embodiment is shown in FIGS. 12-13.

FIG. 4*a*-*c* illustrates the collapsible step ladder 1 with a connection bracket 40 according to a first embodiment of the invention. In order to facilitate the understanding of the invention, the various part of the connection bracket 40 will be described as being attached to the first ladder leg 2. However, as is readily understood by those skilled in the art, it is equally possible to attach the connection bracket 40 to the second ladder leg 3. The same applies to the connection bracket 60 of the second embodiment and the connection bracket 80 of the third embodiment that will be described later on.

FIG. 5*a* illustrates the collapsible step ladder 1 in an extended state and FIG. 5*b* illustrates the collapsible step ladder 1 in a maximally collapsed state. The at least one ladder section 4*a*-*c* is telescopically inserted into the lower ladder section 4*d* to form a collapsible ladder leg 2, 3 that is shown in FIG. 5*b*. The lower ladder section 4*d* is fixed and cannot be collapsed or extended. The connection bracket 40 is shown attached to the rung 11*a* of the first ladder leg 2. In a collapsed state, the connection bracket 40 is thus connected to both sides of the step ladder.

Figure 7A:
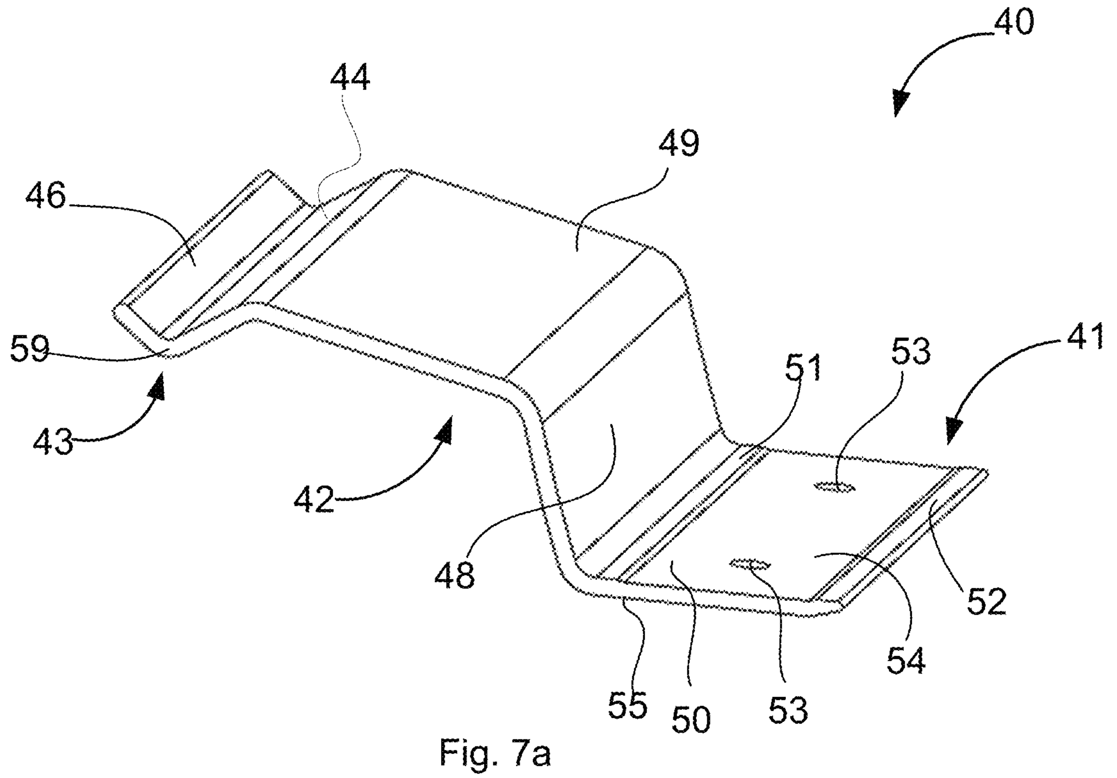
FIG. 7*a* shows a perspective view of the connection bracket according to the first embodiment.
Figure 7B:
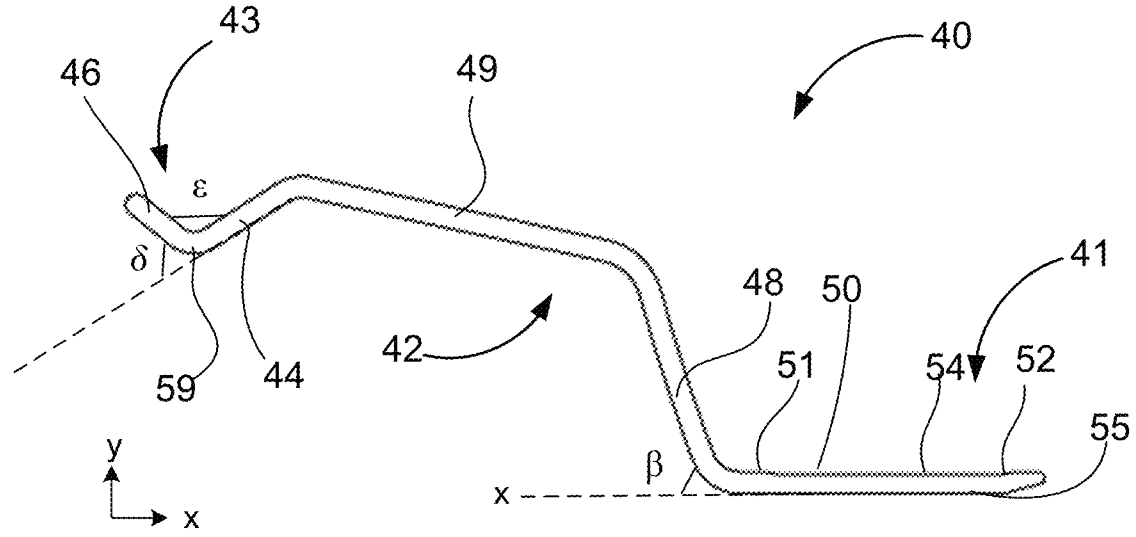
FIG. 7*b* shows a longitudinal cross-section view of the connection bracket according to the first embodiment.
Figure 8A:
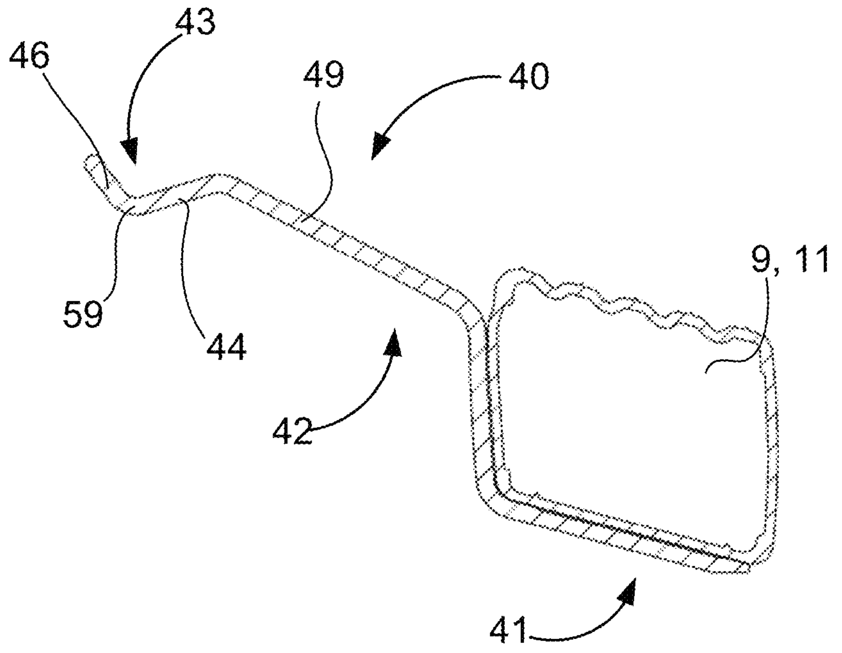
FIG. 8*a* shows a transversal cross-section view of the connection bracket according to the first embodiment attached to a rung.
Figure 8B:
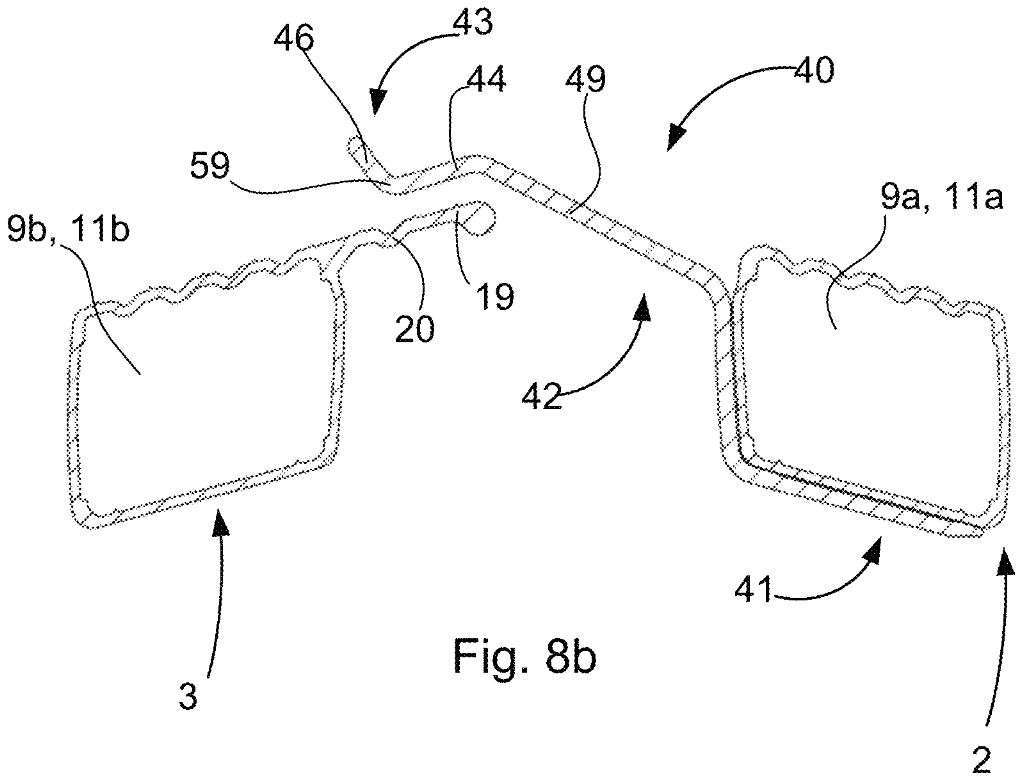
FIG. 8*b* shows a transversal cross-section view of the connection bracket in relation to two rungs of the collapsible stepladder.
Figure 9:
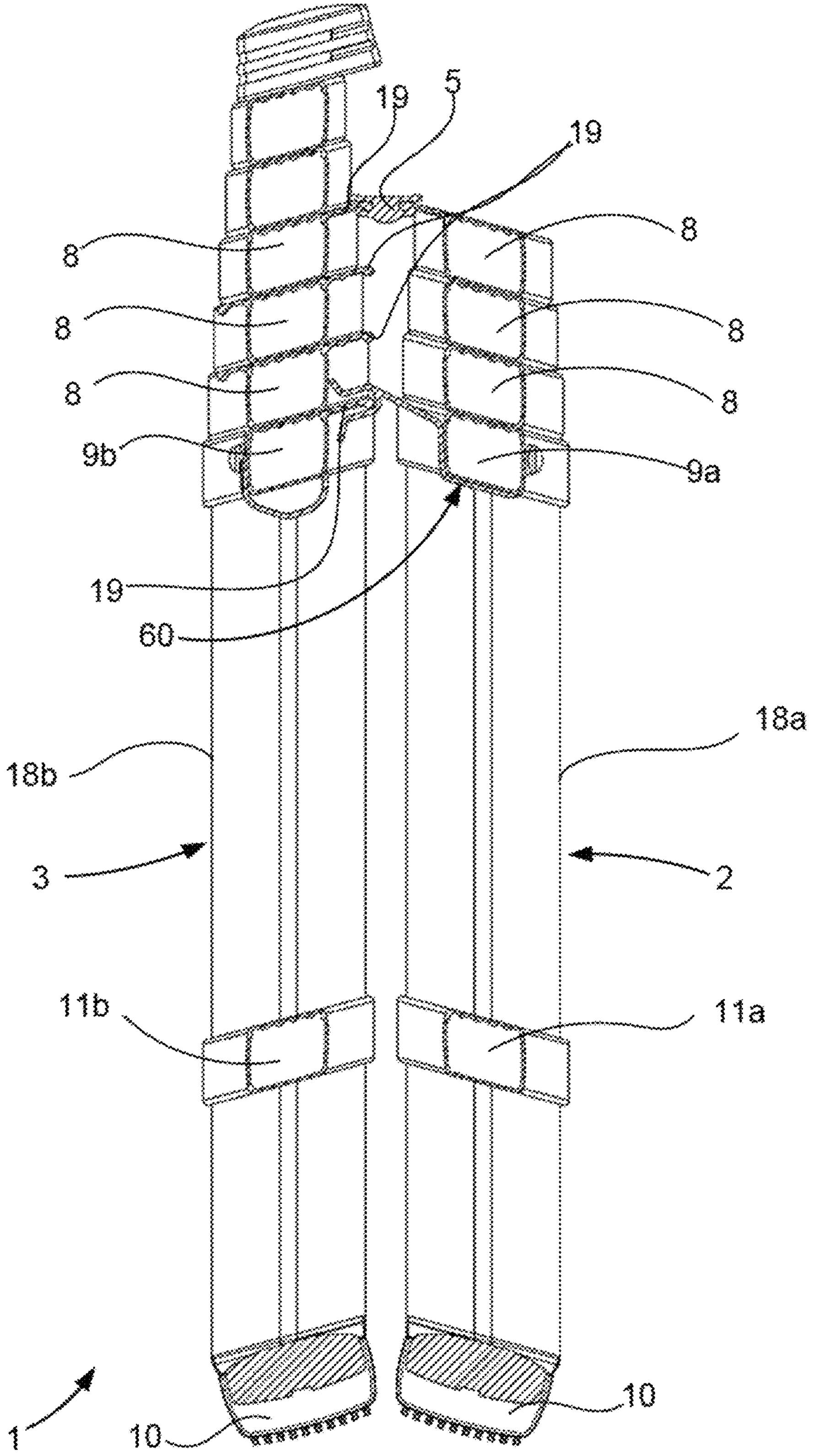
FIG. 9 shows a transversal cross-sectional view of the collapsible step ladder with a connection bracket according to a second embodiment.

FIG. 7*a*-*b* and FIG. 8*a*-*b* also illustrate the connection bracket 40 according to the first embodiment. In FIG. 7*a*-*b*, the connection bracket 40 is not attached the collapsible step ladder 1 thus, enabling a detailed view of the connection bracket 40. In FIG. 8*a*-*b*, the connection bracket 40 is shown attached to a rung 9, 11 of the first ladder leg 2. In FIG. 8*b*, the connection bracket 40 is also shown relative to a rung of the second ladder leg 3 corresponding to the rung of the first ladder leg 2 to which the connection bracket 40 is attached to. This illustrates the relationship between the connection bracket 40 and the rung of the first ladder leg 2 to which the connection bracket 40 is attached and the rung of the second ladder leg 3 to the bracket 40 can be releasably connected to.

The connection bracket 40, 60, 80 is preferably made in one integrated piece, and is thus an integral unit. The connection bracket 40; 60; 80 is thus preferably made of one single material. In one embodiment the connection bracket 40, 60, 80 is molded into the desired shape. In one embodiment the material is aluminum. In yet one embodiment, the material is plastic. However, other materials could also be used. The connection bracket 40, 60, 80 is a cheap solution that is easy to construct. Moreover, the connection bracket 40, 60, 80 is configured such that it can be adapted for all kinds of different telescopic ladders.

The connection bracket 40; 60; 80 has a main body that at least comprise a first end portion 41; 61; 81 and a second end portion 43; 63; 87. The main body may further comprise a an intermediate portion 42; 62; 82. The intermediate portion 42; 62; 82 is arranged between the first end portion 41; 61; 81 and the second end portion 43; 63; 87. As will be apparent, the embodiments of the connection bracket 40; 60; 80 are similar to each other and only differs with regard to the second end portion 43; 63; 87. For the sake of clarity, the details of the connection bracket 40 according to a first embodiment will first be described with reference to FIGS. 4-5 and FIGS. 7-8.

Preferably, the first end portion 41 is configured to be attached the lower surface 25 of the intermediate rung 11*a* or to the upper rung 9*a* of the first ladder leg 2. The intermediate rung 11 or the upper rung 9 are arranged on the lower ladder section 4*d* of the first ladder leg 2 of the collapsible step ladder 1. The lower ladder section 4*d* is a ladder section that is stable/fixed and cannot be collapsed. The first end portion 41 could also be configured to be attached the lower surface of any additional rung attached to the first ladder leg 2.

The first end portion 41 may comprise a space for receiving the intermediate rung 11*a* or the upper rung 9*a*. More precisely, the first end portion 41 of the connection bracket 40 may comprise an upper surface 54 and a lower surface 55. The upper surface 54 is shaped to receive a rung such as the intermediate rung 11*a* or the upper rung 9*a* of the lower ladder section 4*d* of the first ladder leg 2.

As previously mentioned, the main section 22 of the rungs 8, 9, 11, 16 of the collapsible step ladder 1 of the present invention may be slightly inclined with an angle $\alpha$ with respect to a horizontal plane. The angle $\alpha$ may range between 10 and 20 degrees, and more preferably around 15 degrees. The upper surface 54 of the connection bracket 40 may be inclined in the same way as the main section of the rungs 8, 9, 11, 16 to be able to be tightly attached to the intermediate rung 11 and the upper rung 9. Thus, the upper surface 54 of the connection bracket 40 may be slightly inclined with an angle $\beta$ with respect to a horizontal plane. The angle $\beta$ may range between 10 and 20 degrees, and more preferably around 15 degrees.

FIG. 7*b* shows a longitudinal cross-section view of the first end portion 41 of the connection bracket 40 provided at an angle $\beta$ with respect to a horizontal plane. The horizontal plane is marked "x" and the vertical plane is marked "y" in the Figures.

The upper surface 54 of the first end portion 41 of the connection bracket 40 may comprise a longitudinal recess 50 configured to receive the at least one rung 9, 11. The longitudinal recess 50 may be formed by two longitudinal slits 51, 52 spaced apart to receive one rung 9, 11 there between as illustrated in FIG. 7*a*. The longitudinal recess 50 could also be formed by a longitudinal indentation formed in the first end portion 41.

The connection bracket 40 may further comprise one or several openings or holes 53. The openings 53 are configured to tightly fit the connection bracket 40 to the lower surface 25 of the rung 9, 11. In one embodiment, the connection bracket 40 is fastened to the rung 9, 11 by arranging screws into the openings. In another embodiment (not shown), the connection bracket 40 could instead be fastened to the rung 9, 11 by welding or by use of a bayonet mount.

Preferably, the connection bracket 40 is arranged as a permanent part of the first ladder leg 2 of the collapsible step ladder 1 and is not intended to be removed between use. In this way, no loose pieces can be lost.

As previously mentioned, the connection bracket 40 further comprises an intermediate portion 42 and a second end portion 43, which will both now be described in more detail. As is shown in FIG. 7*a-b*, the second end portion 43 of the connection bracket 40 extends from the intermediate portion 42, which is arranged between the first end portion 41 and the second end portion 43.

The intermediate portion 42 comprises a first element 48 extending longitudinally from first end portion 41, as is shown in FIG. 7*a-b*. The intermediate portion 42 may be provided at an angle with respect to a horizontal plane. The intermediate portion 42 further comprises a second element 49 extending longitudinally from the first element 48. The second element 49 may be provided with an angle with respect to first element 48.

The purpose of the intermediate portion 42 is to be a link between the first end portion 41 and the second end portion 43. The intermediate portion 42 may comprise more than two elongated elements or one elongated element. The shape of the intermediate portion 42 shall be adapted to the collapsible step ladder 1 in which it provides a connection between two rungs 9, 11 of the first and the second ladder legs 2, 3.

It is for instance possible that one would want to connect the intermediate rung 11*a* of the first ladder leg 2 to the upper rung 9*b* of the second ladder leg 3. Thus, the two rungs 9, 11 to be connected are not provided in the same height on the collapsible step ladder 1. Thus, it might be necessary to provide an intermediate portion 42. The intermediate portion 42 be arranged with more than two elements extending from each other with different angles to adapt to the geometry of the collapsible ladder step 1.

It is also possible, as is illustrated in FIGS. 4-5 and FIGS. 8*a-b*, that the upper rung 9*a* or the intermediate rung 11*a* of the first ladder leg 2 is connected to the upper rung 9*b* or the intermediate rung 11*b* of the second ladder leg 3 respectively. Thus, the two rungs 9, 11 to be connected are arranged at the same height on the collapsible step ladder 1. Thus, shape and angles of the interconnected elements 48, 49 of the intermediate portion 42 is adapted to this particular geometry of the collapsible ladder step 1.

In one embodiment as shown in FIG. 8*b*, the second end portion 43 is adapted to be received on the flange 19. However, it should be noted that the second end portion 43 could be configured to be arranged directly to a rung 9, 11 without a flange 19 as well.

As illustrated in FIG. 7*a-b*, the second end portion 43 comprises a first connection element 44 and a second connection element 46. The first connection element 44 extends from the second element 49 at an angle with respect to the second element 49. As the first connection element 44 is adapted to be arranged on a flange 19 so that a tight fit is obtained between the flange 19 and the first connection element 44. The first connection element 44 being superimposed upon the flange 19, the first connection element 44 is inclined with essentially the same angle as the flange 19. As previously mentioned, the angle of the flange 19 may in turn be defined by the main section 22 of a rung 8, 9, 11, 16 with respect to the horizontal plane as is illustrated in FIG. 4*a-c*.

In one embodiment, the first connection element 44 is adapted to be arranged on a flange 19. The first connection element 44 may have protrusion or may be ribbed and the flange 19 may be provided with corresponding protrusions or ribs so that the flange 19 and the connection element 44 fit kept together.

The second connection element 46 extends from the first connection element 44. The second connection element 46, is a slit or protruding part that may be used to secure the second end portion 43 to protrusions or ribs arranged on the lower surface 25 of one rung 8, 9, 11, 16 arranged above the rung 9, 11 with which the first connection element 44 interacts.

The second connection element 46 extends at an angle $\varepsilon$ from the first connection element 44. Thus, a convex portion called a locking point 59, is formed between the first connection element 44 and the second connection element 46. The convex portion is faced towards the floor/ground when the connection bracket 40 is attached to the collapsible step ladder 1. Thus, a concave portion, faces away from the floor/ground, when the connection bracket 40 is attached to the collapsible step ladder 1.

The locking point 59 is adapted to interact with a corresponding concave portion which is a cavity 20 arranged on the flange 19. The cavity 20 of the flange 19 and the locking point 59 of the second end portion 43 are formed to be able to fit tightly together and to prevent the second end portion 43 from slipping out of the cavity 20 when the user carries the collapsible step ladder 1 with the connection bracket 40. The locking point 59 and the cavity 20 fit together and prevent the second end portion 43 from coming loose from the flange 19 with which it connected.

The first connection element 44 is adapted to be arranged on-under a flange 19. The first connection element 44 may have protrusion or may be ribbed and the flange 19 may be provided with corresponding protrusions or ribs so that the flange 19 and the connection element 44 fit tightly together.

The second connection element 46, is a slit or protruding part and may also be hooked in another part of the second ladder leg 3, such as a hole and a protruding part provided in bracket sections 24*a*, 24*b* or the rungs 9, 11 provided on the second ladder leg 3.

The releasable connection of the second end portion 43 with the flange 19 of the rung 9, 11 has now been described. However, it is equally possible for the second end portion 43 to be releasably connectable directly to one rung 9, 11. In that case, the description provided above of the interaction between the flange 19 and the connection bracket 40 is also valid for a rung 9, 11. The connection bracket 40 then directly interacts with a rung 9, 11 of the second ladder leg 3 and the word "flange 19" is replaced with "rung 9, 11" for a complete description. This is also part of the scope of the invention.

The shape of the intermediate portion 42 is then adapted to fit that configuration. The second end portion 43 is connectable in the same way as was described for the flange 19, but instead of the flange 19, the elements of the second end portion 43 interacts with step surface 23 or the lower surface 25. The step surface 23 or the lower surface 25 may have protrusions or ribs as well.

The first connection element 44 is adapted to be arranged on the step surface 23 or the under the lower surface 25. The first connection element 44 has protrusion or may be ribbed and the main section 22 may be provided with corresponding protrusions or ribs so that the main section 22 and the connection element 44 can fit tightly together.

In FIG. 8*b* it is illustrated that the second end portion 43 is fitted above the flange 19. The second end portion and the flange may have surfaces shaped to fit tightly together. However, the second end portion 43 could be fitted below the flange 19 as well.

The second end portion 43 could also be attached directly to any one of the two ladder bars 17, 18 or the lowest arranged ladder tubes 6, 7 of the second ladder leg 3. Then the second end portion 43 is provided with gripping means for fastening an end portion of the second end portion 43 to any one of the two ladder bars 17, 18 or the lowest arranged ladder tubes 6, 7 of the second ladder leg 3. Such gripping means could for instance be an openable bracket section resembling the bracket sections 24*a*, 24 *b* used to secure the rungs 8, 9, 11, 16 to the ladder tubes 6, 7 or ladder bars 17, 18.

Now turning to the second embodiment of the invention, which is described in FIG. 9-11. FIG. 9 shows a transversal cross-sectional view of the collapsible step ladder 1 with the connection bracket 60 according to a second embodiment.

In one embodiment, the first end portion 41 of the connection bracket 40 is arranged to the lower ladder section 4*d* of the first ladder leg 2. The second end portion 43 is realizably arranged to the lower ladder section 4*d* of the second ladder leg 3.

The connection bracket 40; 60; 80 is at one end attached to the lower ladder section 4*d* of the first ladder leg 2, at its other opposite end, the connection bracket is releasably attached to a section of the second ladder leg 3. The section could be the lower ladder section 4*d*. The first end portion of the connection bracket may be attached to a rung of the lower ladder section 4*d* of the first ladder leg 2. The second end portion of the connection bracket may be attached to the upper surface of a rung of the second ladder leg 3. Once the second end portion is attached to a section of the second ladder leg 3, the connection portion is in its locked position.

When the connection bracket is attached only to the first ladder leg 2, it is in an unlocked position and when the connection bracket is attached also to the second ladder leg 3 the connection bracket is in its locked position. When the ladder is in use in is extended state, the connection bracket is in its unlocked position. Once the connection bracket is arranged in its locked position, the different sections will engage into each other so that the ladder can be easily moved.

Figure 10A:
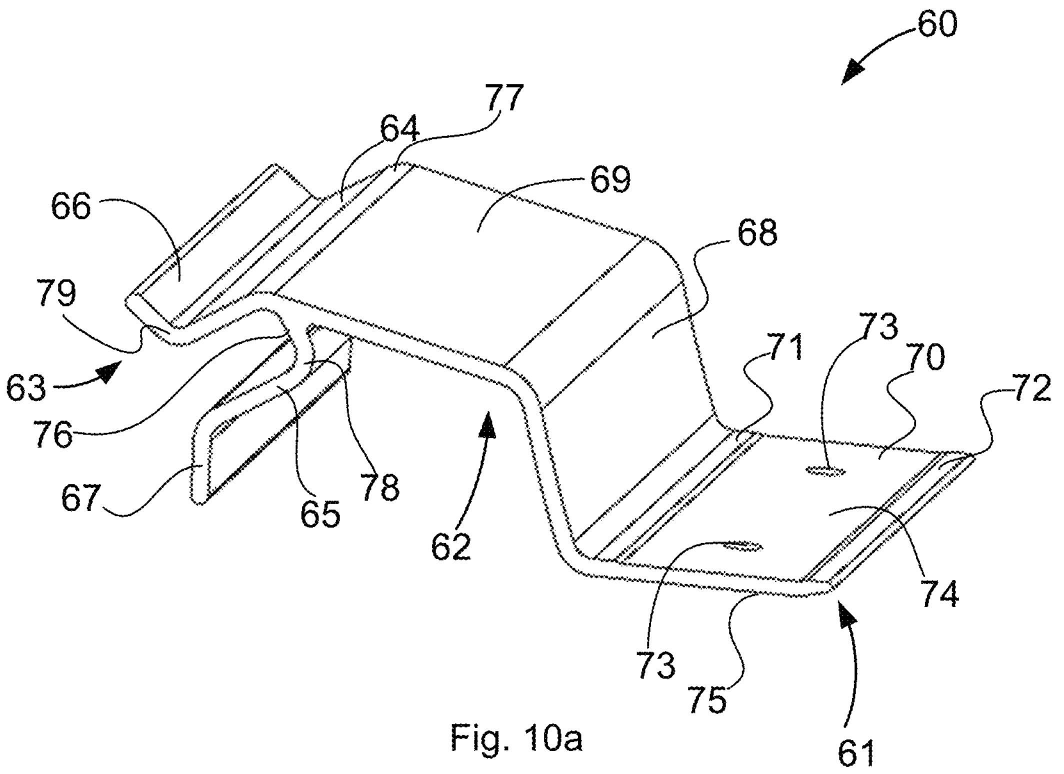
FIG. 10*a* shows a perspective view of the connection bracket according to the second embodiment.
Figure 10B:
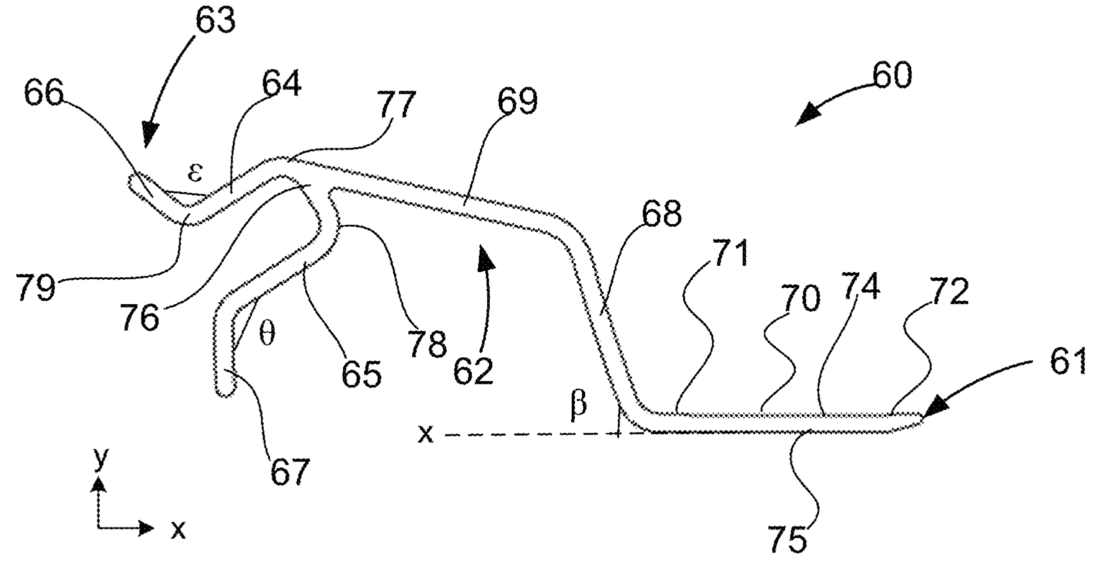
FIG. 10*b* shows a longitudinal cross-section view of the connection bracket according to the second embodiment.

FIG. 10*a* shows a detailed perspective view of the connection bracket 60 according to the second embodiment. FIG. 10*b* shows a longitudinal cross-section view of the connection bracket 60 according to the second embodiment. As can be seen from in these figures, the first end portion 61 and the intermediate portion 62 are identical in both embodiments and are only differentiating in the reference numerals.

As described for the connection bracket of the first embodiment 40, the second end portion 63 is adapted to be releasably connectable to the flange 19 of the upper rung 9 of the lower ladder section 4*d* of the second ladder leg 3. The second end portion 63 is also adapted to be releasably connectable to any other rung 9, 11 of the lower ladder section 4*d* of the second ladder leg 3.

As is shown in FIG. 10*a-b*, the second end portion 63 of the connection bracket 60 extends from the intermediate portion 62, which is arranged between the first end portion 61 and the second end portion 63.

The intermediate portion 62 comprises a first element 68 extending longitudinally from first end portion 61. The intermediate portion 62 may be provided at an angle with respect to a horizontal plane. The intermediate portion 62 further comprises a second element 69 extending longitudinally from the first element 68. The second element 69 may be provided with an angle with respect to first element 68.

The purpose of the intermediate portion 62 is to be a link between the first end portion 61 and the second end portion 63. The intermediate portion 62 may comprise more than two elongated elements or one elongated element. The shape of the intermediate portion 62 shall be adapted to the collapsible step ladder 1 in which it provides a connection between two rungs 9, 11 of the first and the second ladder legs 2, 3.

It is for instance possible that one would want to connect the intermediate rung 11 of the first ladder leg 2 to the upper rung 9 of the second ladder leg 3. Thus, the two rungs 9, 11 to be connected are not provided in the same height on the collapsible step ladder 1. Then, it may be necessary to provide a intermediate portion 62 with more than two elements extending from each other with different angles to adapt to the geometry of the collapsible ladder step 1.

It is also possible, as is illustrated in FIG. 9, that one would want to connect the upper rung 9 or the intermediate rung 11 of the first ladder leg 2 to the upper rung 9 or the intermediate rung 11 of the second ladder leg 3 respectively. Thus, the two rungs 9, 11 to be connected are arranged at the same height on the collapsible step ladder 1. Then, the shape and angles of the interconnected elements 68, 69 of the intermediate portion 62 need to be adapt to this particular geometry of the collapsible ladder step 1.

The second end portion 63 of the connection bracket 60 extends from the second element 69 of the intermediate portion 62 as can be seen in FIG. 10*a*-*b*. The second end portion 63 comprises a first connection element 64 and a second connection element 66.

As illustrated in FIG. 10*a*-*b*, the first connection element 64 extends from the second element 69 at an angle with respect to the second element 69. The first connection element 64 extends from the second element 69 at an angle with respect to the second element 69. As the first connection element 64 is adapted to be arranged on a flange 19 so that a tight fit is obtained between the flange 19 and the first connection element 64. The first connection element 64 being superimposed upon the flange 19, the first connection element 64 is inclined with essentially the same angle as the flange 19. As previously mentioned, the angle of the flange 19 may in turn be defined by the main section 22 of a rung 8, 9, 11, 16 with respect to the horizontal plane as is illustrated in FIG. 4*a*-*c*.

The second connection element 66 extends from the first connection element 64. The second connection element 66, is a slit or protruding part that may be used to secure the second end portion 63 to protrusions or ribs arranged on the lower surface 25 of one rung 8, 9, 11, 16 arranged above the rung 9, 11 with which the first connection element 64 interacts. The second connection element 66 extends at an angle ε from the first connection element 64.

The connection bracket 60 further comprise a third connection element 76, a fourth connection element 65 and a fifth connection element 67. The third connection element 76 comprises a first end portion 77 and a second end portion 78. The first end portion 77 extends from the second element 69 of the intermediate portion 62 in a direction that may be essentially perpendicular to the first connection element 64. The first connection element 64 also extends from the second element 69 of the intermediate portion 62. Preferably, third connection element 76 is shorter than the intermediate portion 62.

The fourth connection element 65 extends from the second end portion 78 of the third connection element 76. The fifth connection element 67 extends from the fourth connection element 67 with an angle θ. The angle θ is essentially the same as the angle ε extending between the second connection element 66 and the first connection element 64.

Preferably, the first connection element 64 and the fourth connection element 65 have the same length and are essentially parallel to each other. From the fourth connection element 78, extends the fifth connection element 67 with at an angle E.

Preferably, the second connection element 66 and the fifth connection element 67 have the same length and are angled in away from each other. Preferably, the first connection element 64 and fourth connection element 65 are identical and symmetrical to one another. Preferably, second connection element 66 and the fifth connection element 67 are identical and symmetrical to one another. However, it is possible to provide the first connection element 64, second connection element 66, the third connection element 76, the fourth connection element 65 and the fifth connection element 67 with different angles and lengths is saw fit. The connection elements 64, 65, 66, 67, 76 should be configured to hold a rung 9, 11.

When the collapsible step ladder 1 is in the collapsed state, the connection bracket 60, which may be permanently attached to the first end portion 61, is releasably connectable to any rung 9, 11 of lower ladder section 4*d* of the second ladder leg 3 or to any flange 19, if a flange 19 is provided on rung 8, 9, 11, 16 of the second ladder leg 3.

If flanges 19 are provided on the rungs 8, 9, 11, 16 of the second ladder leg 3, the flange 19 should be received in the area provided between the first connection element 64, the third connection element 76 and the fourth connection element 65 as can be seen in FIG. 9.

If flanges 19 are not provided, one rung 9, 11, such as upper rung 9 or intermediate rung 11 should be arranged within the area formed between the first connection element 64, the third connection element 76 and the fourth connection element 65. More specifically, the main section 22 of the rung 9, 11 is arranged in the area formed by the first connection element 64, the third connection element 76 and the fourth connection element 65. The step surface 23 of the run 9, 11 being faced towards the first connection element 64 and the lower surface 25 of the of the run 9, 11 being faced towards the fourth connection element 65.

The first connection element 64, the third connection element 76 and the fourth connection element 65, may be adapted to the shape of the main section 22 of the rung 9, 11. As previously discussed, an exemplary embodiment of a rung 8, 9, 11, 16 is shown in FIG. 3*a*-*b* and has been described above. The angles and shapes of the first connection element 64, the third connection element 76 and the fourth connection element 65 may be adapted to the described rung 9, 11.

As previously described, when the ladder is arranged in the collapsed state, a user may lift the ladder from the ground by lifting any part of the lower ladder section 4*d* of the first ladder leg 2 or the second ladder leg 3. The lower ladder sections 4*d* of the first ladder leg 2 or the second ladder leg 3 are interconnected by the connection bracket 60 when the collapsible ladder step 1 is arranged in the collapsed state and the second end portion 43 is connected to the flange 19 or rung 9, 11 of the second ladder leg 3.

The connection bracket 60 provides an anti-tilt mechanism by having the first connection element 64 and the fourth connection element 65. Since flange 19 or rung 9, 11 of the second ladder leg 3 is trapped between the first connection element 44 and the fourth connection element 65 in an essentially vertical direction. Thus, preventing the collapsible step ladder 1 from tilting and falling.

It should be noted that it is possible to omit the second connection element 66 and the fifth connection element 67 of the connection bracket 40, 60.

FIG. 11 illustrates a collapsible step ladder 1 with the connection bracket 60 arranged on a rung 9, 11 of the first ladder leg 2. In FIG. 11, an extendable rod 14 is also illustrated. The rod 14 may extend between any two rungs 9, 11 of the first ladder leg 2 and the second ladder leg 3 that are arranged at the same height in respect of a vertical plane. In FIG. 11, the rod 14 is attached to the upper rung 9 of the first ladder leg 2 and to the upper rung 9 of the second ladder leg 3. The rod 14 could instead be attached to the intermediate rung 11 of the first ladder leg 2 and to the upper rung 9 of the second ladder leg 3. The rod 14 increases the stability of the ladder 1 in the extended mode and prevents the ladder legs 2,3 from splaying apart. The rod 14 could also be a strap. The strap 14 could be attached between any two rungs. Hence, if present, the rod 14 is extending between the two ladder legs 2, 3 when the collapsible step ladder is in its extended state. Once the collapsible step ladder is put in its collapsed state, the rod may be detached from one of the ladder legs 2,3 thus allowing the collapsible step ladder to be collapsed. Once in its collapsed state, the connection bracket 60 is arranged to interact with the opposite ladder leg 2, 3 as previously been described.

The invention has been described above in detail with reference to embodiments thereof. However, as is readily understood by those skilled in the art, other embodiments are equally possible within the scope of the present invention, as defined by the appended claims.

The invention claimed is:

1. A collapsible step ladder comprising:

a first ladder leg and a second ladder leg hingedly connected to each other at one end;

wherein each of the first and the second ladder legs includes at least one ladder section having two tube portions arranged parallel to each other and interconnected at one end by a rung to form a U-shaped ladder section that is telescopically inserted into a lower ladder section;

wherein the lower ladder sections of the first and the second ladder legs each includes two ladder bars arranged parallel to each other and interconnected by at least one rung;

a connection bracket with a main body having at least a first end portion and a second end portion;

wherein the first end portion is attached to the lower ladder section of the first ladder leg; and wherein the second end portion is releasably connectable to the lower ladder section of the second ladder leg when the collapsible step ladder is in a collapsed state.

2. The collapsible step ladder of claim 1, wherein the first end portion is attached to one rung of the lower ladder section of the first ladder leg.

3. The collapsible step ladder according to claim 2, wherein the first end portion of the connection bracket is attached to a lower surface of the rung.

4. The collapsible step ladder according to claim 2, wherein the first end portion of the connection bracket is attached to an upper surface of the rung of the lower ladder section of the first ladder leg.

5. The collapsible step ladder according to claim 2, wherein the first end portion of the connection bracket is connected to the rung of the first ladder leg by screwing, welding, or by a bayonet mount.

6. The collapsible step ladder according to claim 1, wherein the lower ladder section of the first ladder leg comprises at least an upper rung and an intermediate rung; and wherein the lower ladder section of the second ladder leg comprises at least an upper rung and an intermediate rung; and wherein the second end portion of the connection bracket is releasably connectable to any one of the rungs or to any one of the two ladder bars of the lower ladder section of the second ladder leg.

7. The collapsible step ladder according to claim 1, wherein the connection bracket further comprises an intermediate portion; and wherein the a intermediate portion is arranged between the first end portion and the second end portion.

8. The collapsible step ladder according to claim 1, wherein at least one rung of the second ladder leg comprises a flange that extends from the rung.

9. The collapsible step ladder according to claim 8, wherein the second end portion is releasably connectable to the flange of the rung of the second ladder leg.

10. The collapsible step ladder according to claim 1, wherein the connection bracket is of a unitary, one-piece construction.

11. The collapsible step ladder according to claim 1, wherein the connection bracket is made of aluminum.

12. A connection bracket for use with a collapsible step ladder having a first ladder leg and a second ladder leg that are hingedly connected to each other at one end, each of the first and the second ladder legs including at least one ladder section having two tube portions arranged parallel to each other and interconnected at one end by a rung to form a U-shaped ladder section that is telescopically inserted into a lower ladder section, wherein the lower ladder sections of the first and the second ladder legs each includes two ladder bars arranged parallel to each other and interconnected by at least one rung, the connection bracket comprising:

a main body having at least a first end portion and a second end portion;

wherein the first end portion is configured to be attached to the lower ladder section of the first ladder leg; and wherein the second end portion is releasably connectable to the lower ladder section of the second ladder leg when the collapsible step ladder is in a collapsed state.

* * * * *